US010599380B2

(12) United States Patent
Sarkar et al.

(10) Patent No.: US 10,599,380 B2
(45) Date of Patent: Mar. 24, 2020

(54) METHOD AND SYSTEM FOR AUTOMATICALLY MANAGING CONTENT IN AN ELECTRONIC DEVICE

(71) Applicant: Samsung Electronics Co., Ltd., Suwon-si, Gyeonggi-do (KR)

(72) Inventors: Amit Sarkar, Bangalore (IN); Dipin Kollencheri Puthenveettil, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 199 days.

(21) Appl. No.: 15/408,093

(22) Filed: Jan. 17, 2017

(65) Prior Publication Data

US 2017/0206052 A1 Jul. 20, 2017

(30) Foreign Application Priority Data

Jan. 14, 2016 (IN) .............................. 201641001451
Jan. 11, 2017 (IN) .............................. 201641001451

(51) Int. Cl.
*G01C 21/36* (2006.01)
*G06F 3/14* (2006.01)
(Continued)

(52) U.S. Cl.
CPC ......... *G06F 3/1454* (2013.01); *G01C 21/362* (2013.01); *G01C 21/3617* (2013.01);
(Continued)

(58) Field of Classification Search
CPC combination set(s) only.
See application file for complete search history.

(56) References Cited

U.S. PATENT DOCUMENTS 10,006,769 B2 *  6/2018  Rhee ...................... G01C 21/00
2002/0087632 A1 *  7/2002  Keskar ................... H04W 99/00
                                                               709/204
(Continued)

FOREIGN PATENT DOCUMENTS

EP            1 729 091 A1    12/2006
KR    10-2012-0016956 A        2/2012
(Continued)

OTHER PUBLICATIONS

Jibing Gong, Jie Tang and A.C.M. Fong, "ACTPred: Activity Prediction in Mobile Social Networks", Tsinghua Science and Technology, Jun. 2014, pp. 265-274, vol. 19.
(Continued)

*Primary Examiner* — Hien L Duong
(74) *Attorney, Agent, or Firm* — Jefferson IP Law, LLP

(57) ABSTRACT

A system and method for content management in an electronic device is provided. The method includes determining first attributes of a first content in a first application by analyzing the first content while the first application is active in the electronic device, receiving a query request for second attributes corresponding to a second content of a second application executed in an external device from the external device and transmitting, in response to the second attributes request query, the target data information for generating at least one icon to be displayed on the external device to the external device based on the first attributes and the second attributes.

27 Claims, 24 Drawing Sheets

(51) Int. Cl.
*G06F 3/147* (2006.01)
*G06F 9/451* (2018.01)
*G06F 40/30* (2020.01)
*G06F 40/40* (2020.01)
*G06F 3/0481* (2013.01)
*G06F 3/0482* (2013.01)

(52) U.S. Cl.
CPC ........ *G06F 3/0482* (2013.01); *G06F 3/04817* (2013.01); *G06F 3/147* (2013.01); *G06F 3/1423* (2013.01); *G06F 9/451* (2018.02); *G06F 40/30* (2020.01); *G06F 40/40* (2020.01)

(56) References Cited

U.S. PATENT DOCUMENTS

| | | | |
|---|---|---|---|
| 2005/0252959 A1* | 11/2005 | Gaumond | H04N 21/41407 235/375 |
| 2007/0157220 A1* | 7/2007 | Cordray | H04H 60/65 725/9 |
| 2007/0157222 A1* | 7/2007 | Cordray | H04H 60/33 725/13 |
| 2007/0157223 A1* | 7/2007 | Cordray | H04H 60/33 725/13 |
| 2008/0005168 A1* | 1/2008 | Huff | G06Q 10/109 |
| 2008/0280600 A1* | 11/2008 | Zhou | H04M 1/2745 455/415 |
| 2009/0005072 A1* | 1/2009 | Forstall | G01C 21/20 455/456.1 |
| 2009/0075673 A1 | 3/2009 | Kim et al. | |
| 2009/0170525 A1 | 7/2009 | Baghdasaryan | |
| 2012/0101818 A1* | 4/2012 | Scott | G06Q 10/109 704/231 |
| 2012/0179367 A1* | 7/2012 | Niu | G01C 21/3605 701/446 |
| 2012/0254246 A1* | 10/2012 | Kerger | H04W 4/21 707/780 |
| 2012/0265433 A1 | 10/2012 | Viola et al. | |
| 2012/0310922 A1* | 12/2012 | Johnson | G06F 17/30867 707/722 |
| 2013/0042183 A1 | 2/2013 | Martinez et al. | |
| 2013/0225087 A1* | 8/2013 | Uhm | H04L 67/34 455/41.3 |
| 2013/0226453 A1* | 8/2013 | Trussel | H04L 51/20 701/533 |
| 2013/0332074 A1* | 12/2013 | Rhee | G01C 21/00 701/487 |
| 2014/0129133 A1 | 5/2014 | Wang | |
| 2014/0195621 A1* | 7/2014 | Rao DV | H04L 12/1827 709/206 |
| 2014/0282072 A1 | 9/2014 | Martinez et al. | |
| 2014/0365901 A1* | 12/2014 | Moha | G01C 21/367 715/738 |
| 2015/0172393 A1* | 6/2015 | Oplinger | H04L 67/18 709/204 |
| 2016/0112362 A1* | 4/2016 | Perazzo | H04L 51/18 455/466 |
| 2016/0125061 A1* | 5/2016 | Neiman | G06Q 30/0251 707/737 |
| 2016/0203217 A1* | 7/2016 | Anisingaraju | G06F 17/30705 707/738 |
| 2016/0260433 A1* | 9/2016 | Sumner | G06F 17/30976 |
| 2016/0342449 A1* | 11/2016 | Wong | G06F 17/24 |
| 2016/0352887 A1* | 12/2016 | Na | H04M 1/72527 |
| 2017/0083520 A1* | 3/2017 | Huang | G06F 17/30047 |
| 2017/0098152 A1* | 4/2017 | Kerr | G06F 3/04842 |
| 2017/0177710 A1* | 6/2017 | Burlik | G06F 17/30401 |

FOREIGN PATENT DOCUMENTS

| | | |
|---|---|---|
| KR | 10-2012-0027735 A | 3/2012 |
| WO | 2014/145134 A1 | 9/2014 |
| WO | 2014/151153 A2 | 9/2014 |

OTHER PUBLICATIONS

Faisal M. Khan, Todd A. Fisher, Lori Shuler, Tianhao Wu and William M. Pottenger, "Mining Chat-room Conversations for Social and Semantic Interactions", Computer Science and Engineering, Lehigh University (2002).

Vijay Srinicasan, Saeed Moghaddam, Abhishek Murkherji, Kiran K. Rachuri, Chenren Xu and Emmanuel Munguia Tapia, "MobileMiner: Mining Your Frequent Patterns on Your Phone", pp. 1-12, Samsung Research America and WINLAB, Rutgers University (2014).

Siu Cheung Hui, Yulan He and Haichao Dong, "Text Mining for Chat Message Analysis", pp. 1-6, School of Computer Engineering Nanyang Technological University, Singapore and Informatics Research Centre, The University of Reading,Reading RG6 6BX, UK (2008).

Joao Bartolo Gomes, Clifton Phua and Shonali Krishnaswamy, "Where will you go? Mobile Data Mining for Next Place Prediction", pp. 1-12, Institute for Infocomm Research (I2R), A*STAR, Singapore (2013).

Extended European Search Report dated Nov. 2, 2018, issued in a counterpart European application No. 17738702.4-1224/3362920.

European Office Action dated Jan. 2, 2020, issued in European Patent Application No. 17738702.4.

* cited by examiner

Car 1000, User-A

Car 1000, User-A
Destination: Wife's location
Route: Via Grocery store

METHOD AND SYSTEM FOR AUTOMATICALLY MANAGING CONTENT IN AN ELECTRONIC DEVICE

CROSS-REFERENCE TO RELATED APPLICATION(S)

This application claims the benefit under 35 U.S.C. § 119(a) of an Indian Provisional application filed on Jan. 14, 2016 in the Indian Intellectual Property Office and assigned Serial number 201641001451, and of an Indian patent Application filed on Jan. 11, 2017 in the Indian Intellectual Property Office and assigned Serial number 201641001451, the entire disclosure of each of which is hereby incorporated by reference.

TECHNICAL FIELD

The present disclosure relates to an electronic device. More particularly, the present disclosure relates to a system and method for automatically managing content in an electronic device.

BACKGROUND

Generally, it is common for a user when using a primary application want to access data available in a secondary application. Typically, the user is required to manually activate the secondary application and navigate to the desired data. Further, the user then needs to close the secondary application to return to the primary application.

In systems and methods of the related art, consider a scenario where the user needs to access content in an application from another application context. In this case, the user needs to perform multiple operations manually such as navigating to other application and performing interactions such as copy-paste, drag, etc. which is inconvenient and time consuming for the user. Consider another scenario where the user needs to access or transfer the content within the same application. In this case, the user needs to transition across different screens manually involving multiple operations which are inconvenient and time consuming for the user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a system and method for automatically managing content in an electronic device.

Another aspect of the present disclosure is to provide a system and method for receiving, by a content management engine, an input indicating selection of content or a feature event in the electronic device.

Another aspect of the present disclosure is to provide a system and method for determining, by the content management engine, at least one of a current user context and a historic user context.

Another aspect of the present disclosure is to provide a system and method for causing, by the content management engine, to display at least one graphical element of at least one target data item for at least one of the current user context and the historic user context.

In accordance with an aspect of the present disclosure, a method for content management in an electronic device is provided. The method includes determining first attributes of a first content in a first application by analyzing the first content while the first application is active in the electronic device, receiving a query request for second attributes corresponding to a second content of a second application executed in an external device from the external device and transmitting, in response to the second attributes request query, target data information for generating at least one icon based on the first attributes and the second attributes to be displayed on the external device to the external device.

In accordance with another aspect of the present disclosure, an electronic device is provided. The electronic device includes a transceiver configured to communicate with an external device, and at least one processor configured to determine first attributes of a first content in a first application by analyzing the first content while the first application is active in the electronic device, to receive a query request for second attributes corresponding to a second event of a second application executed in the external device from the external device and to transmit, in response to the second attributes request query, data information for generating at least one icon to be displayed on the external device to the external device based on the first attributes and the second attributes.

In accordance with another aspect of the present disclosure, an electronic device is provided. The electronic device includes a memory, configured to store instructions, and at least one processor, that when executing the stored instructions, is configured to determine attributes of content in a first application by analyzing the content while the first application is active in the electronic device, receive a query request for attributes corresponding to an event of a second application executed in at least one external device from the at least one external device, and transmit, in response to the request query, target data information for generating at least one icon to be displayed on the at least one external device to the external device based on the attributes of content in the first application and the attributes corresponding to the event of the second application.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
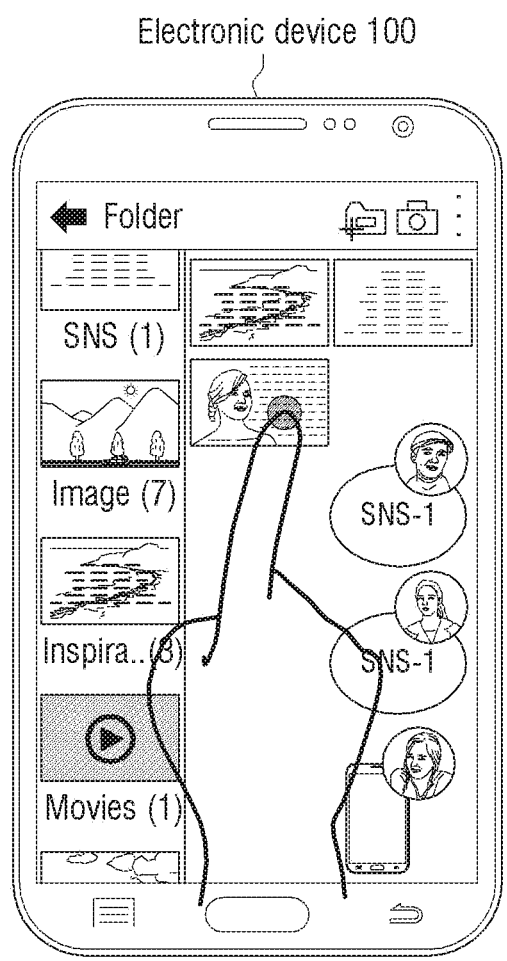
FIG. 1 illustrates an example for automatically managing content in an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The various embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the various embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the various embodiments herein can be practiced and to further enable those skilled in the art to practice the various embodiments herein. Accordingly, the examples should not be construed as limiting the scope of the various embodiments herein.

The various embodiments herein disclose a method for automatically managing content in an electronic device. The method includes receiving an input indicating selection of the content or a feature event in an application in the electronic device. In an example, the feature event can be tapping an input area in a chat application. Further, the method includes determining at least one of a current user context and a historic user context. Further, the method includes causing to display at least one graphical element of at least one target data item for at least one of the current user and the historic user context.

Unlike systems and methods of the related art, the proposed method provides a mechanism for triggering an application specific query to determine stored application specific attributes in a memory of the electronic device from a particular application context. Further, the proposed method provides a mechanism for representing the application specific query results returned, using the at least one graphical elements for easy access from the application context. Further, the proposed method can be used to share the content between the electronic devices thus, allowing the user to easily access the content from any application context, including cross-applications or cross-device contents.

Unlike systems and methods of the related art, the proposed method provides a robust and simple mechanism for automatically managing the content. Further, the proposed method enables a user of the electronic device to easily access the relevant content from any application context, including cross-applications content or cross-device contents. Further, the proposed method provides the user with probable route suggestions based on chat conservation.

Further, seamless retrieval of routes information from a memory of the electronic device.

Referring now to the drawings, and more particularly to FIGS. 1 to 4, 5A, 5B, 6 to 8, 9A, 9B, 10A, 10B, 11A to 11E, 12A to 12C, 13, and 14, where similar reference characters denote corresponding features consistently throughout the figures, there are shown preferred embodiments.

FIG. 1 illustrates an example for automatically managing content in an electronic device according to an embodiment of the present disclosure.

Referring to FIG. 1, in an embodiment, an electronic device 100 can be, for example, a laptop, a desktop computer, a mobile phone, a mobile terminal, a mobile station, a smart phone, personal digital assistants (PDAs), a tablet, a phablet, a consumer electronic device, dual display devices, or any other electronic device.

Initially, the electronic device 100 can be configured to analyze previous interaction history of a user with various applications available in the electronic device 100 and application data. Based on the interaction history and the application data, the electronic device 100 can be configured to extract (or determine) and store a relation between a data object and its intended target. Further, the electronic device 100 can be configured to use the pending relation stored across other electronic devices to intelligently generate new sharing targets (at least one graphical elements of at least one target application) such as across applications, across services, and across other electronic devices associated with the user.

In an embodiment, consider a scenario where the user selects content (i.e., text, photo, music, or the like) or an application feature (i.e., event) in the electronic device 100. As shown in the FIG. 1, the user selects inspirational quote image. After selecting the inspirational quote image, corresponding attributes of the inspirational quote image are analyzed and compared with the pending relations in the electronic device 100. The different applications (i.e., social networking site (SNS)-1, SNS-2), other electronic devices, and the services with which the content can be shared are displayed to the user of the electronic device 100 as shown in the FIG. 1. In an embodiment, metadata of the user selected image is analyzed and the applications, other electronic devices, the services with which the content can be shared are displayed on the electronic device 100.

Figure 2:
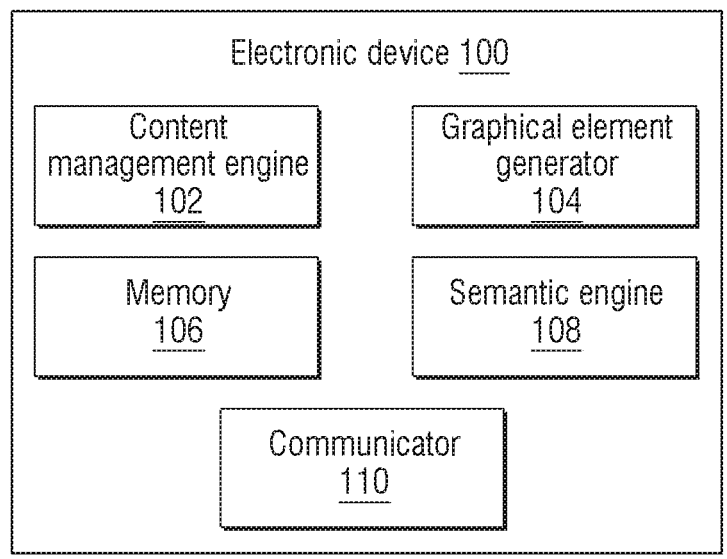
FIG. 2 illustrates various units of an electronic device for automatically managing content according to an embodiment of the present disclosure.

FIG. 2 illustrates various units of an electronic device for automatically managing the content according to an embodiment of the present disclosure.

Referring to FIG. 2, in an embodiment, the electronic device 100 includes a content management engine 102, a graphical element generator 104, a memory 106, a semantic engine 108, and a transceiver or communicator 110.

The content management engine 102 can be configured to receive an input indicating selection of the content (for example, the content herein can refer to a feature of an application or data) in the electronic device 100. In an example, the content can be the text, the photo, the music, or the like) or the application feature (i.e., event). Further, the content management engine 102 can be configured to determine at least one of a current user context and a historic user context. In an embodiment, the current user context is associated with an application currently active on the electronic device 100. In an example, the application can be a Chat application, a Messenger application, a SNS application, an E-mail application, a Gallery application, a Navigation application, a Calendar application or any other applications available in the electronic device 100. In an embodiment, the historic context is associated with one of an application conversation, user behavior, and past interactions of the user. In an example, the application conversation, can a chat conversation.

Further, the content management engine 102 can be configured to extract parameters associated with the content from a current interaction context. Further, the content management engine 102 can be configured to determine a degree of similarity between the extracted parameters associated with the content and parameters associated with at least one of the current user context and the historic user context. Further, the content management engine 102 can be configured to cause to display at least one graphical element of at least one target data item corresponding to at least one of the current user context and the historic user context based on the degree of similarity. Further, the functionalities of the content management engine 102 are explained in conjunction with FIG. 3. In an example, the graphical element is an icon. In an example, the target data item is a target application, a target service, a target device, or the like. In an embodiment, the at least one graphical element of the at least one target data item is dynamically generated by the graphical element generator 104.

The memory 106 may include one or more computer-readable storage media. The memory 106 may include non-volatile storage elements. Examples of such non-volatile storage elements may include magnetic hard discs, optical discs, floppy discs, flash memories, or forms of electrically programmable read only memories (EPROM) or electrically erasable and programmable ROM (EEPROM). In addition, the memory 106 may, in some examples, be considered a non-transitory storage medium. The term "non-transitory" may indicate that the storage medium is not embodied in a carrier wave or a propagated signal. However, the term "non-transitory" should not be interpreted to mean that the memory 106 is non-movable. In some examples, the memory 106 can be configured to store larger amounts of information than the memory. In certain examples, a non-transitory storage medium may store data that can, over time, change (e.g., in random access memory (RAM) or cache). Further, the functionalities of the memory 106 are explained in conjunction with FIG. 3. In an example, the memory 106 can be cloud storage. The functionalities of the semantic engine 108 are explained in conjunction with FIG. 10A and FIG. 10B. The communicator 110 can be configured for communicating internally between the units and externally with the networks.

FIG. 2 shows various units of the electronic device 100, but it is to be understood that other embodiments are not limited thereon. In other embodiments, the electronic device 100 may include less or more number of units. Further, the labels or names of the units are used only for illustrative purpose and does not limit the scope of the disclosure. One or more units can be combined together to perform same or substantially similar function in the electronic device 100.

Figure 3:
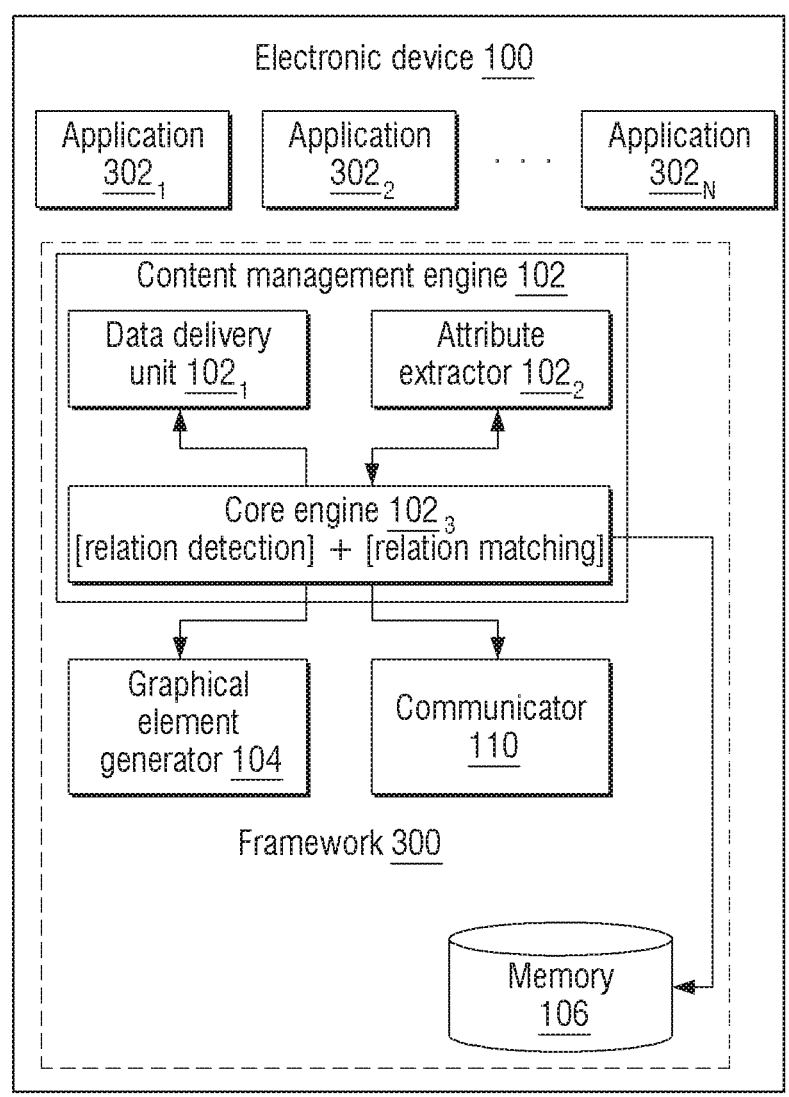
FIG. 3 is a schematic overview of a framework in an electronic device for automatically managing content according to an embodiment of the present disclosure.

FIG. 3 is a schematic overview of a framework in an electronic device for automatically managing the content according to an embodiment of the present disclosure.

Referring to FIG. 3, in an embodiment, a framework 300 includes a plurality of applications 302N (i.e., here after referred as the application(s) 302), the content management engine 102, the graphical element generator 104, the memory 106, and the communicator 110. The content management engine 102 includes a data delivery unit 1021, an attribute extractor 1022, and a core engine 1023 (i.e., a relation detector and matcher component).

The attribute extractor 1022 can be configured to extract (or determine) the interaction history of the user with different applications, across all other devices of the user. Further, the attribute extractor 1022 can be configured to extract various types of attributes (for example: metadata, meta-type, natural language processing (NLP), semantics, location, or the like) and provide to the core engine 102c for relation formation and matching. The metadata involves inherent meaning of the data. In an example, the semantic meaning relating actors with an object or a topic. In case of an image or a video, the metadata can be the object or a scene recognized within the image or the video data. An example scenario illustrating extraction of the attributes from a chat application and a navigation application is explained in conjunction with FIG. 5A. The core engine 1023 can be configured to detect the relation between interaction identification (ID), corresponding data object, or data input, and the extracted attributes. Further, the core engine 1023 can be configured to identify whether the data is pending or target input is pending. After identifying that the data is pending or the target input is pending, the core engine 1023 can be configured to add a pending entry in the memory 106.

Further, the core engine 1023 can be configured to compare the attributes with the existing entries in the memory 106. Further, the core engine 1023 can be configured to retrieve a matching entry from the memory 106. An example scenario for retrieving the matching entry from the memory 106 for the chat application and the navigation application is explained in conjunction with FIG. 5B. Further, the core engine 1023 can be configured to communicate with other units in the electronic device 100. The graphical element generator 104 can be configured to generate the at least one graphical element (i.e., icon) dynamically from the interaction ID. Further, the graphical element generator 104 can be configured to provide the generated at least one graphical element to the core engine 1023. The data delivery unit 102a can be configured to use the interaction ID and provided data to deliver to the target application input, with which the data needs to be shared. The communicator 110 can be configured to communicate with the users other devices or other electronic devices, available in an authorization list.

In an example, authorized user ID and device ID is shown below in Table 1:

TABLE 1

Authorized user ID and device ID

| Authorized User ID | Device ID |
|---|---|
| User-A (Self) | Mobile#1, Tablet#1, Car#1 |
| User-B | Mobile#2 |

The content management engine 102 can be configured to track and can collaborate the interaction history in all the users' devices (single login/authorized as self). If added to the authorization list, the content management engine 102 can be configured to communicate and deliver the data to other electronic devices. A target location in other electronic device is selected based on the matched interaction ID stored in the memory 106.

In an embodiment, the target location can be extended to build a shared database across users for much wider sharing of the interaction history and the content sharing. However, this should be limited to a privileged group, based on a user setting or user-prompt, as this might involve privacy concerns. The memory 106 stores discovered relations as the user keeps on interacting with various applications (for example: interaction ID vs. context information, pending data vs. target device, etc.). Further, different priority approaches are described below:

Priority Approach-1: Current Interaction>Recent Cross Device Interactions>Historical Interactions Each data entry is assigned a priority (high value) and the priority reduces as the data entry spends more time in the memory 106. After a threshold time, the data entry is removed from the memory 106. Thus, latest data gets the highest priority. When multiple matches occur, the top priority data entries can be displayed in order.

Priority Approach-2: Calculate and Compare Match Points

In this approach, metadata information (i.e., several feature information points) is extracted about the captured context. Based on the match score, the highest matching element gets the highest priority. Further, the calculation of the match point can be performed based on supervised, semi-supervised, or un-supervised learning techniques which can rank the items based on similarity or relation among feature points between the query parameters and the stored parameters belonging to current or historical context. In an example, getting a probability score for each pair of comparisons and using it as the matching score. The lowest priority or unused data entries, spending more time in the memory 106 can be removed after the threshold time. This is due to the fact that some of the items in the memory 106, might not match with any queries for long duration. Such items can be removed after a threshold time to reduce the usage of the memory 106.

In an embodiment, the content management engine 102 operates on the electronic device 100 and interacts with other electronic device as a distributed system. In an embodiment, the data is exchanged across the electronic devices only whenever some user interaction occurs on the data within authorized users or the electronic devices.

In an embodiment, the content management engine 102 can also be implemented as server based solution. In this case, only a communication component at the electronic device 100 is required. Core logic of the content management engine 102 can be implemented at the server.

In another embodiment, the content management engine 102 may include less or more number of units. Further, the labels or names of the units are used only for illustrative purpose and does not limit the scope of the disclosure. One or more units can be combined together to perform same or substantially similar function in the content management engine 102.

Figure 4:
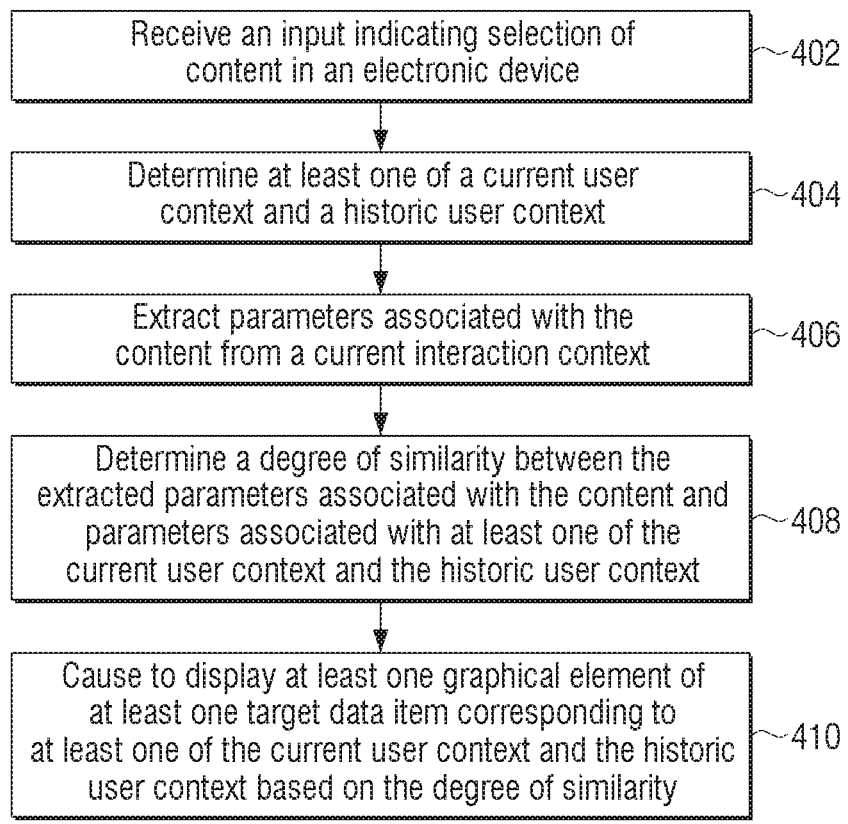
FIG. 4 is a flow chart illustrating a method for automatically managing content in an electronic device according to an embodiment of the present disclosure.

FIG. 4 is a flow chart illustrating a method for automatically managing the content in an electronic device according to an embodiment of the present disclosure.

Referring to FIG. 4, at operation 402, the method includes receiving the input indicating selection of the content in the electronic device 100. The method allows the content management engine 102 to receive the input indicating selection of the content in the electronic device 100.

At operation 404, the method includes determining at least one of the current user context and the historic user context. The method allows the content management engine 102 to determine at least one of the current user context and the historic user context. In an embodiment, the current user context is associated with the application currently active on the electronic device 100. In an embodiment, the historic user context is associated with one of the chat conversation, user behavior, and past interactions of a user. At operation 406, the method includes extracting parameters associated with the content from the current interaction context. The method allows the content management engine 102 to extract parameters associated with the content from the current interaction context.

At operation 408, the method includes determining the degree of similarity between the extracted parameters associated with the content and the parameters associated with at least one of the current user context and the historic user context. The method allows the content management engine 102 to determine the degree of similarity between the extracted parameters associated with the content and the parameters associated with at least one of the current user context and the historic user context. In an embodiment, the target data item is the target application, the target service, the target device, or the like.

At operation 410, the method includes causing to display the at least one graphical element of the at least one target data item corresponding to the at least one of the current user context and the historic user context based on the degree of similarity. The method allows the content management engine 102 to cause to display the at least one graphical element of the at least one target data item corresponding to the at least one of the current user context and the historic user context based on the degree of similarity. In an embodiment, the at least one graphical element of the at least one target data item is dynamically generated by the graphical element generator 104. In an embodiment, the at least one graphical element is dynamically arranged based on the priority associated with the graphical element.

The various actions, acts, blocks, operations, or the like in the flow chart 400 may be performed in the order presented, in a different order or simultaneously. Further, in some embodiments, some of the actions, blocks, operations, or the like may be omitted, added, modified, skipped, or the like without departing from the scope of the disclosure.

Figure 5A:
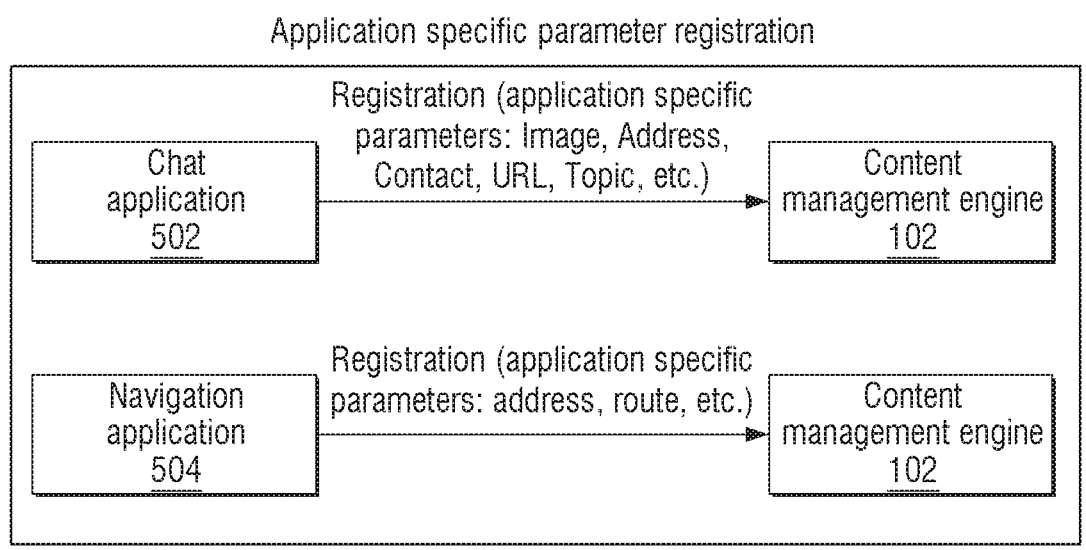
FIG. 5A illustrates an example for registering application specific parameters according to an embodiment of the present disclosure.

FIG. 5A illustrates an example for registering application specific parameters according to an embodiment of the present disclosure.

Application Specific Parameters describe a specific set of parameters which the application registers one time with the content management engine 102. The parameters include various simple and complex data types such as address, image, contact, route information, uniform resource locator (URL), etc. Further, the parameters are used to form queries for receiving the attributes from the content management engine 102.

Referring to FIG. 5A, the content management engine 102 can be configured to capture the interaction history of the user with the chat application 502 and the interaction history of the user with the navigation application 504. Further, the content management engine 102 can be configured to extract various attributes. In case of the chat application 502, the content management engine 102 can be configured to perform registration of the parameters such as the image, the address, a contact, a URL, a topic, or the like. In case of the navigation application 504, the content management engine 102 can be configured to perform registration of the parameters such as the address, the route information, or the like. In an embodiment, the parameters, set by the application during registration is shown below Table 2:

TABLE 2

| | Parameters |
|---|---|
| Image | Chat, Gallery, Browser, etc. |
| Audio | Chat, Music application, etc. |
| Video | Chat, Video application etc. |

TABLE 2-continued

| | Parameters |
|---|---|
| Text/HTML/URL | Chat, Browser, etc. |
| Contact information | Chat, Browser, etc. |
| Address information | Maps, Chat, Contacts application |
| Schedule | Calendar, Chat application |

Figure 5B:
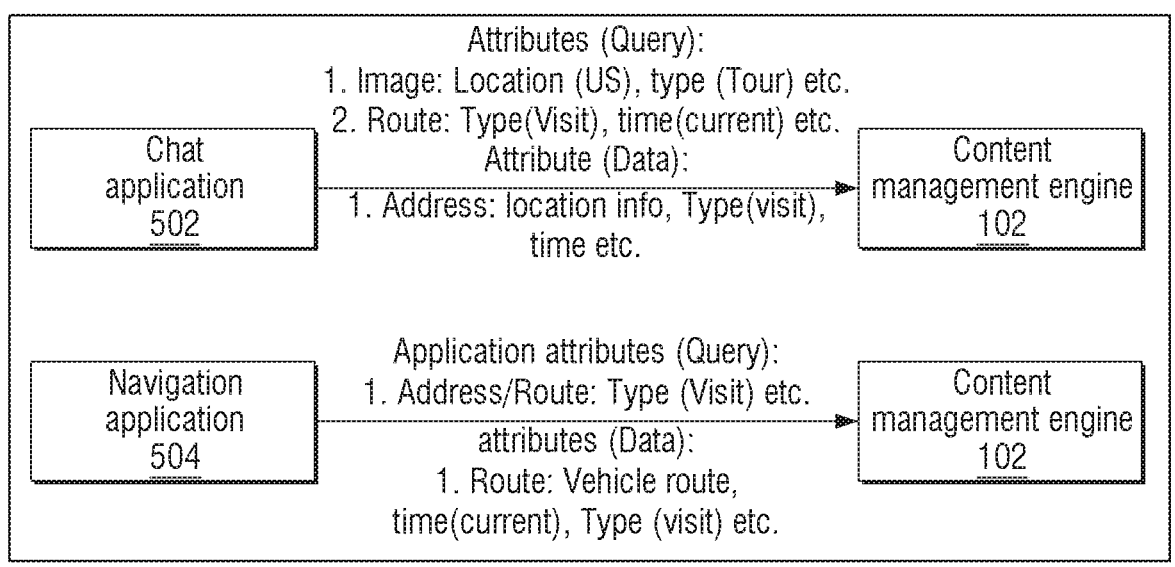
FIG. 5B illustrates an example for extracting (or determining) attributes for an application (i.e., parameter specific) according to an embodiment of the present disclosure.

FIG. 5B illustrates an example for extracting the attributes for the application (i.e., parameter specific) according to an embodiment of the present disclosure.

Attributes: The parameter is used to filter out corresponding attributes during the content/event analysis by components such as NLP/semantic engine etc. These attributes are then stored in the memory 106 along with other contextual information. Further, the attributes are also used to form a query and retrieve the results.

In case of the chat application 502, the content management engine 102 can be configured to send the query to extract the attributes of the chat application 502. The query sent to the chat application 502 and the data received from the chat application 502, by the content management engine 102, is described below:

Chat application 502 attributes (Query):
 a. Image: Location (US), Type (tour), etc.
 b. Route: Type (Visit), Time (current), etc.
Chat application 502 attribute (data):
 a. Address: Location information, Type (visit), time, etc.

In case of the navigation application 504, the content management engine 102 can be configured to send the query to extract the attributes of the navigation application 504. The query sent to the navigation application 504 and the data received from the navigation application 504, by the content management engine 102, is described below:

Navigation application 504 attributes (Query):
 a. Address/Route: Type (Visit) etc.
Navigation application 504 attributes (Data):
 b. Route: Vehicle route, time (current), Type (visit), etc.

Figure 6:
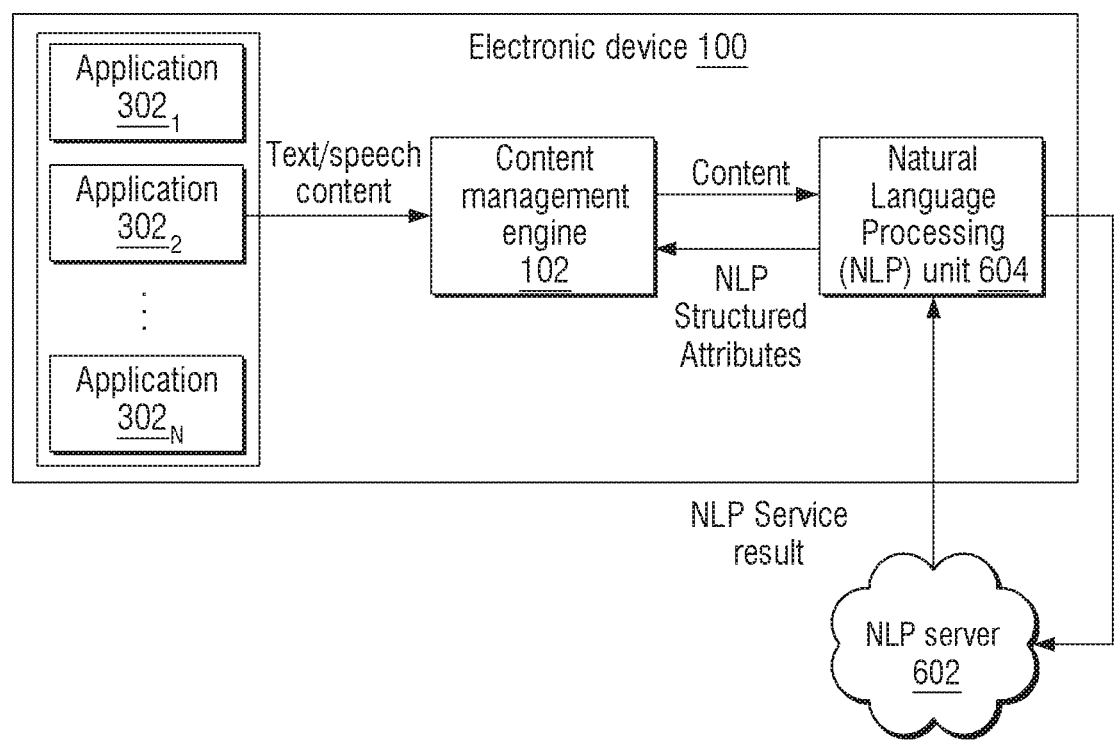
FIG. 6 is a system illustrating an interaction between a content management unit and a natural language processing (NLP) unit for extracting (or determining) the attributes from an NLP server according to an embodiment of the present disclosure.

FIG. 6 is a system illustrating an interaction between a content management unit and an NLP unit for extracting the attributes from an NLP server according to an embodiment of the present disclosure.

Referring to FIG. 6, the system includes the electronic device 100 and an NLP server 602. The electronic device 100 includes the applications 302, the content management engine 102, and an NLP unit 604. In an example, the application can be the chat application 502, the mail application, the message application, the SNS application, a browser application, a voice conversation application, the navigation application 504, or any other applications available in the electronic device 100.

In an embodiment, few implementation options are provided below:

Implementation-1: As a service (for example, NLP web service application program interfaces (APIs)
 a. The content management engine 102 can be configured to perform direct NLP service call and process the NLP service result to prepare the attributes corresponding to each of the parameter.

Implementation-2: As an in-device NLP unit 604 as shown in the FIG. 6, in which the NLP unit 604 interacts with the NLP server 602 for extracting the attributes.
 a. The content management engine 102 can be configured to initialize the NLP unit 604 with the parameters.
 b. The content management engine 102 can be configured to pass the content, on which intent needs to be determined.

c. The NLP unit 604 can be configured to use the registered parameters to generate appropriate service calls to the NLP server 602. Further, the NLP unit 604 can be configured to return the attributes corresponding to each of the parameter.

Figure 7:
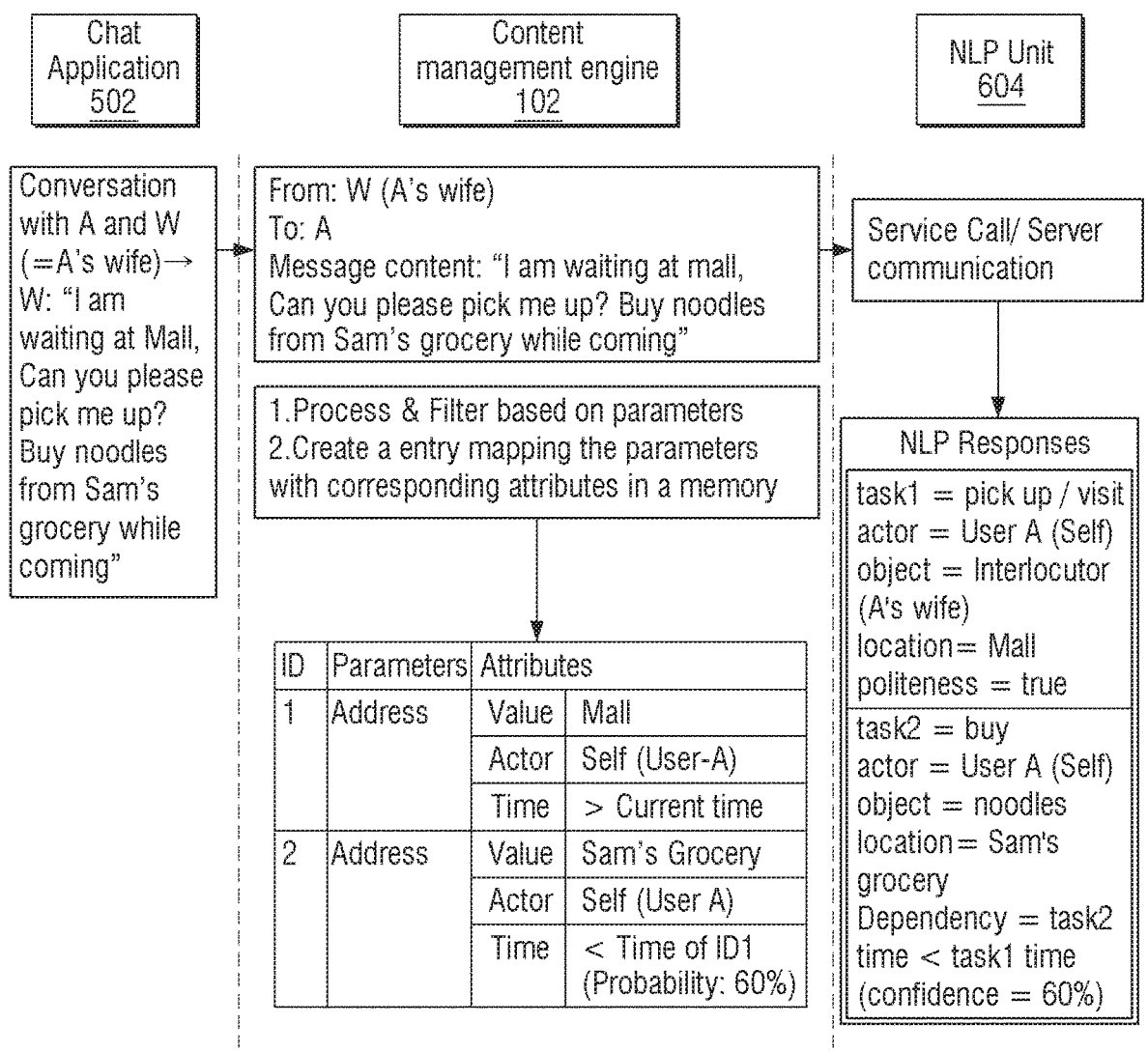
FIG. 7 illustrates an example interaction between a content management unit and an NLP unit according to an embodiment of the present disclosure.

FIG. 7 illustrates an example interaction between a content management unit and an NLP unit according to an embodiment of the present disclosure.

Referring to FIG. 7, the content management engine 102 receives the message content (i.e., chat conversation between the user and his wife) "I am waiting at a Mall, Can you please pick me up? Buy noodles from Sam's grocery while coming". After receiving the message content, the content management engine 102 sends the service call to the NLP unit 604. The NLP unit 604 sends the following responses as described below:

Response-1:
a. Task-1=Pick up/Visit
b. Actor=User-A (self)
c. Object=Interlocutor (User-A wife)
d. Location=Mall
e. Politeness=True Response-2:
a. Task-2=Buy
b. Actor=User-A (self)
c. Object=noodles
d. location=Sam's grocery
e. Dependency=Task-2 time<Task-1 time (confidence=60%).

After receiving the responses, the content management engine 102 can be configured to process and filter based on the parameters. Further, the content management engine 102 can be configured to create the entry (or data entry) in the memory 106 as shown below in Table 3.

TABLE 3

| | | Data Entry | |
|---|---|---|---|
| ID | Parameters | | Attributes |
| 1 | Address | Value | Mall |
| | | Actor | Self (User-A) |
| | | Time | >Current time |
| 2 | Address | Value | Sam's Grocery |
| | | Actor | Self (User-A) |
| | | Time | <Time of ID-1 (Probability: 60%) |

Figure 8:
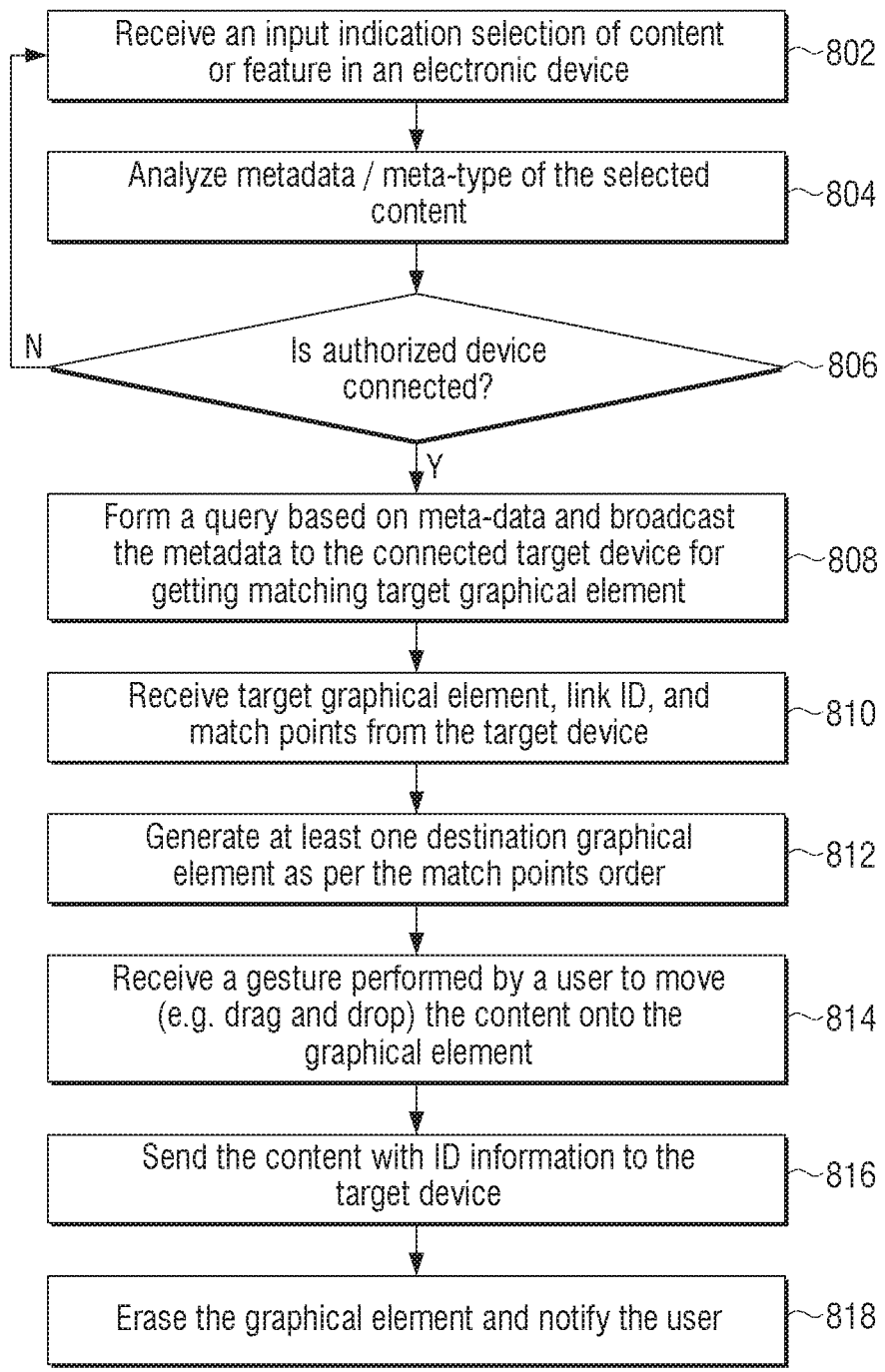
FIG. 8 is a flow chart illustrating a method for automatically managing content in a source device according to an embodiment of the present disclosure.

FIG. 8 is a flow chart illustrating a method for automatically managing content in a source device according to an embodiment of the present disclosure.

Referring to FIG. 8, in an embodiment, the source device is an electronic device 100a and a target device is an electronic device 100b.

At operation 802, the method includes receiving the input indicating selection of the content or the feature event in the electronic device 100a. The method allows a content management engine 102a to receive the input indicating selection of the content or the feature event in the electronic device 100a. At operation 804, the method includes analyzing the metadata or the meta-type of the selected content or the feature event. The method allows the content management engine 102a to analyze the metadata or the meta-type of the selected content or the feature event.

If it is determined, at operation 806, that the authorized electronic device 100b is connected then, at operation 808, the method includes forming a query based on the metadata and broadcasting the metadata to the electronic device 100 (i.e., target device) for getting matching target graphical element. The method allows the content management engine 102a to form the query based on the metadata and broadcast the metadata to the electronic device 100b. In an example, sending the metadata parameters as part of the query to determine matching data elements from other electronic devices, which are connected. If it is determined, at operation 806, that the authorized electronic device 100b is not connected then, the method is looped back to operation 802.

At operation 810, the method includes receiving the at least one matched target data item, link ID, and match points from the electronic device 100b. The method allows the content management engine 102a to receive the at least one matched target data item, the link ID, and the match points from the electronic device 100b. At operation 812, the method includes generating the at least one graphical element (i.e., destination graphical element) as per the match points order. The method allows the content management engine 102a to generate the at least one graphical element (i.e., destination graphical element) as per the match points order.

At operation 814, the method includes receiving a gesture performed by the user to drag and drop the content onto the graphical element. The method allows the content management engine 102a to receive the gesture performed by the user to drag and drop the content onto the graphical element. At operation 816, the method includes sending the content with the ID information to the electronic device 100b. The method allows the content management engine 102a to send the content with the ID information to the electronic device 100b. At operation 818, the method includes erasing the graphical element and notifying the user. The method allows the content management engine 102a to erase the graphical element and notify the user.

The various actions, acts, blocks, operations, or the like in the flow chart 800 may be performed in the order presented, in a different order or simultaneously.

Further, in some embodiments, some of the actions, blocks, operations, or the like may be omitted, added, modified, skipped, or the like without departing from the scope of the disclosure.

Figure 9A:
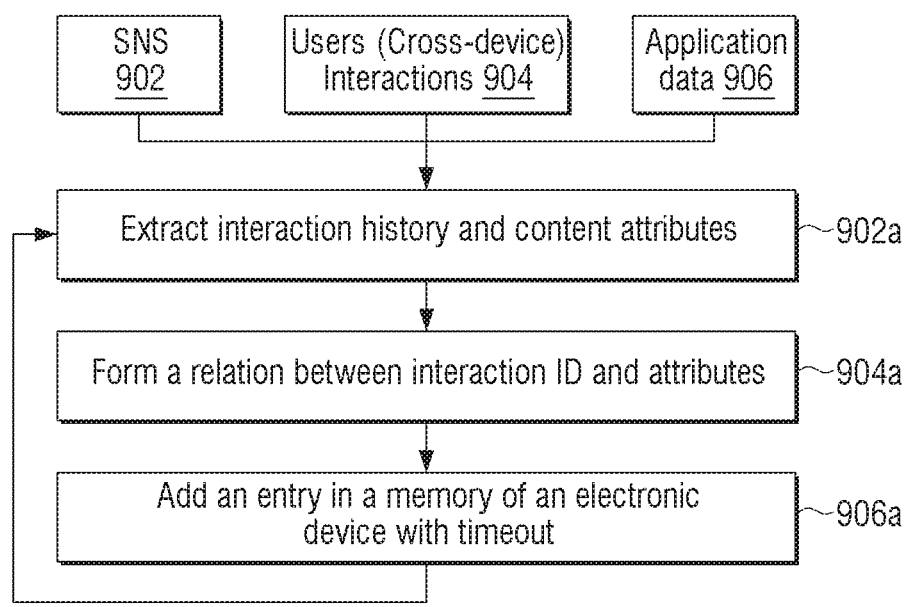
FIG. 9A is a flow chart illustrating a method for adding an entry into a memory of an electronic device according to an embodiment of the present disclosure.

FIG. 9A is a flow chart illustrating a method for adding an entry into a memory of an electronic device according to an embodiment of the present disclosure.

Referring to FIG. 9A, at operation 902a, the method includes extracting the interaction history and the content attributes of the SNS 902, users (cross device) interactions 904, the application data 906, or the like. The method allows the content management engine 102b to capture the interaction history and the content attributes of the SNS 902, the users (cross device) interactions 904, the application data 906, or the like.

At operation 904a, the method includes forming the relation between the interaction ID and the attributes. The method allows the content management engine 102b to form the relation between the interaction ID and the attributes. At operation 906a, the method includes adding the entry in the memory 106b of the electronic device 100b with timeout and looped back to operation 902a. The method allows the content management engine 102b to add the entry in the memory 106b for further re-use and looped back to operation 902a. In an embodiment, the entry includes the relation between the interactions ID and the attributes. In an example, some of the attributes, which are stored in the memory 106, can become invalid after some time. Consider a scenario where the user's location at first instance can become invalid after some time if the user is moving or changing his/her location. In this case, the timeout helps to check if the data is valid or not. Further, the stored data is invalidated and trigger fetching of live data, which in turn can be updated and stored in the memory 106.

The various actions, acts, blocks, operations, or the like in the flow chart 900a may be performed in the order presented, in a different order or simultaneously. Further, in some embodiments, some of the actions, blocks, operations, or the like may be omitted, added, modified, skipped, or the like without departing from the scope of the disclosure.

Figure 9B:
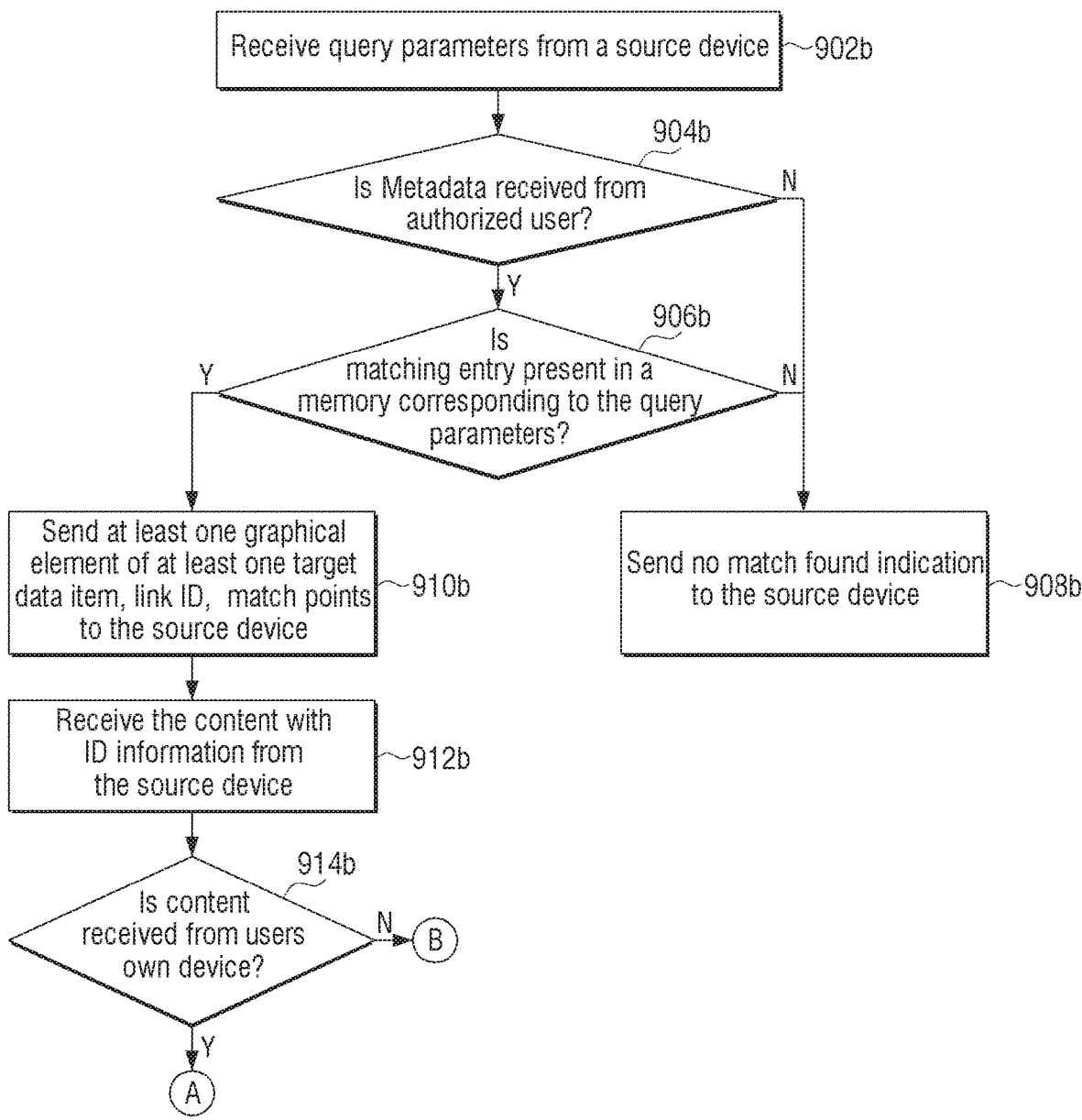
FIG. 9B is a flow chart illustrating a method for automatically managing content in a target device or target screen according to an embodiment of the present disclosure.
Figure 9B:
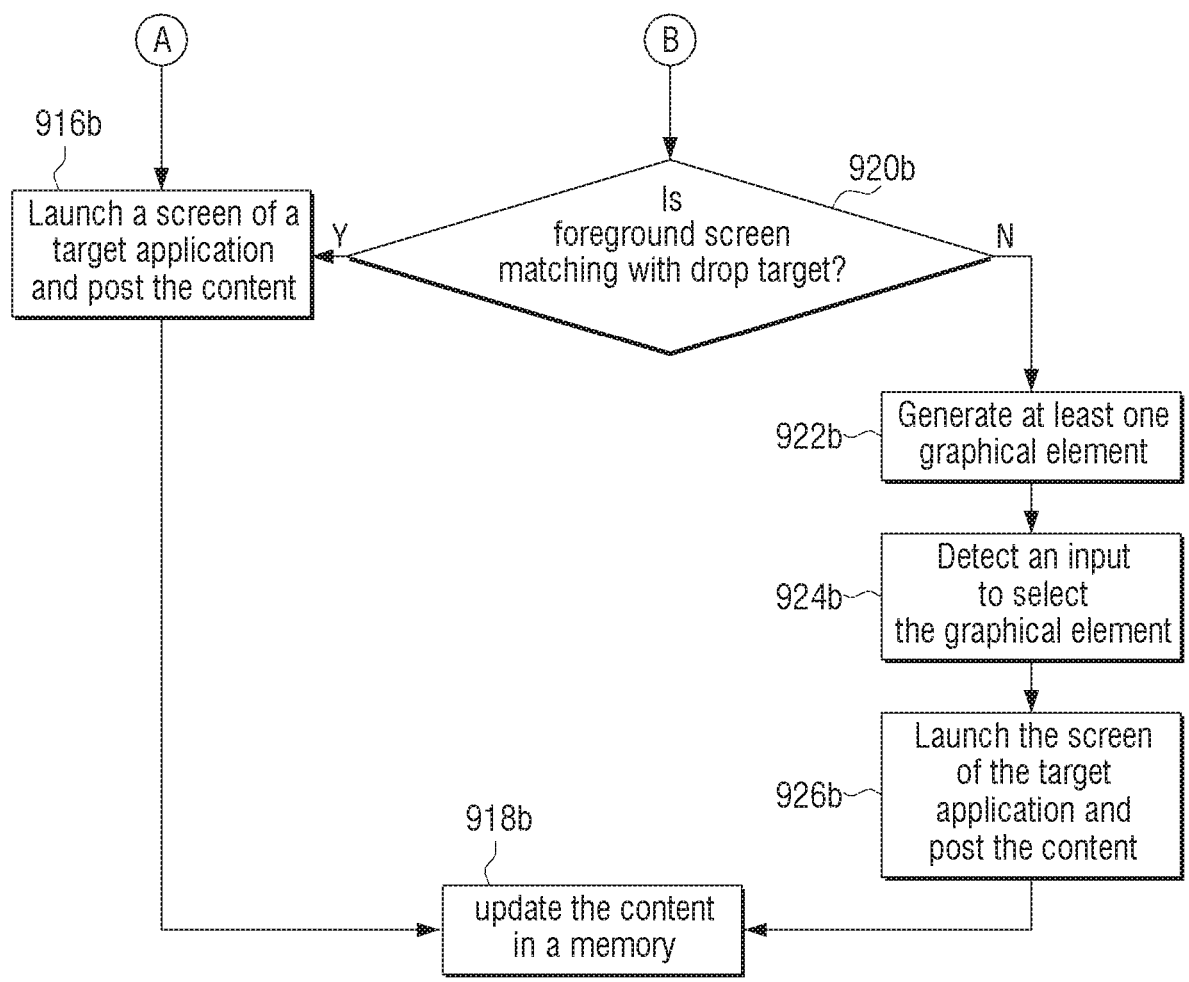

FIG. 9B is a flow chart illustrating a method for automatically managing content in a target device or a target screen according to an embodiment as of the present disclosure.

Referring to FIG. 9B, at operation 902b, the method includes receiving the query parameters from the electronic device 100a. The method allows the content management engine 102a to receive the query parameters from the electronic device 100a.

If it is determined, at operation 904b, that the metadata is from the authorized user then, at operation 906b, the method includes determining whether the matching entry present in the memory 106b corresponding to the query parameters. The method allows the content management engine 102b to determine whether the matching entry present in the memory 106b corresponding to the query parameters. If it is determined, at operation 904b, that the metadata is not from the authorized user then, at operation 908b, the method includes sending no match found indication to the electronic device 100a. The method allows the content management engine 102b to send the no match found indication to the electronic device 100a.

If it is determined, at operation 906b, that the metadata of the content exists in the memory 106b then, at operation 910b, the method includes sending the at least one graphical element of the at least one target data item, link ID, match points to the electronic device 100a. The method allows the content management engine 102b to send the at least one graphical element of the at least one target data item, the link ID, the match points to the electronic device 100a. If it is determined, at operation 906b, that the metadata of the content does not exist in the memory 106b then, the method performs operation 908b as described above.

At operation 912b, the method includes receiving the content with ID information from the electronic device 100a. The method allows the content management engine 102b to receive the content with the ID information from the electronic device 100a. If it is determined, at operation 914b, that the content is received from the user's electronic device 100a then, at operation 916b, the method includes launching a screen of a target application and post the content. The method allows the content management engine 102b to launch the screen of the target application and post the content. At operation 918b, the method includes updating the content in the memory 106b. The method allows the content management engine 102b to update the content in the memory 106b. The operation 914b is performed to ensure that the electronic device 100a and the electronic device 100b belong to different users or different users are operating in both the devices. Once the data is transferred and dropped on the graphical icon, it does not create distraction for the other user in his/her device by launching a different application screen than the current screen. A notification bubble can be used to notify that the data is available and ready, but it does not directly launch a new screen until the user selects the bubble. When the user selects the bubble, actual target location screen is launched where the transferred data is dropped.

In an example, consider a scenario where the electronic device 100a has a form field opened and the electronic device 100b has the data. The icon is generated corresponding to the form field. If the data is dropped to the icon, the data is sent to the electronic device 100a and is pasted to the form field. Consider another scenario where there are different users operating in the electronic device 100a and the electronic device 100b and the form field screen is changed (by switching to other application) when the drop is performed in the electronic device 100a. Even though, the data is pushed to the electronic device 100a, it does not launch the form field screen immediately until the user taps the notification bubble.

If it is determined, at operation 914b, that the content is not received from the user's electronic device 100a then, at operation 920b, the method includes determining whether a foreground screen matching with the drop target. If it is determined, at operation 920b, that the foreground screen matching with the drop target then, at operation 916b, the method performs operation 916b as described above. If it is determined, at operation 920b, that the foreground screen not matching with the drop target then, at operation 922b, the method includes creating a content bubble (i.e., notification). The method allows the content management engine 102b to create the content bubble. In an example, the content bubble indicates that the data is dropped in the electronic device 100b after match was detected and the user at the electronic device 100a has performed some gesture on one of the generated icons to send the data to the electronic device 100b. It helps to avoid sudden distraction or transition in the foreground screen if there were some other user operating on the electronic device 100b.

At operation 924b, the method includes detecting an input on the content bubble performed by the user. The method allows the content management engine 102b to detect the input on the content bubble performed by the user. At operation 926b, the method includes launching the screen of the target application and post the content; and the method performs operation 918b as described above. The method allows the content management engine 102b to launch the screen of the target application and post the content; and the method performs operation 918b as described above.

The various actions, acts, blocks, operations, or the like in the flow chart 900b may be performed in the order presented, in a different order or simultaneously. Further, in some embodiments, some of the actions, blocks, operations, or the like may be omitted, added, modified, skipped, or the like without departing from the scope of the disclosure.

Figure 10A:
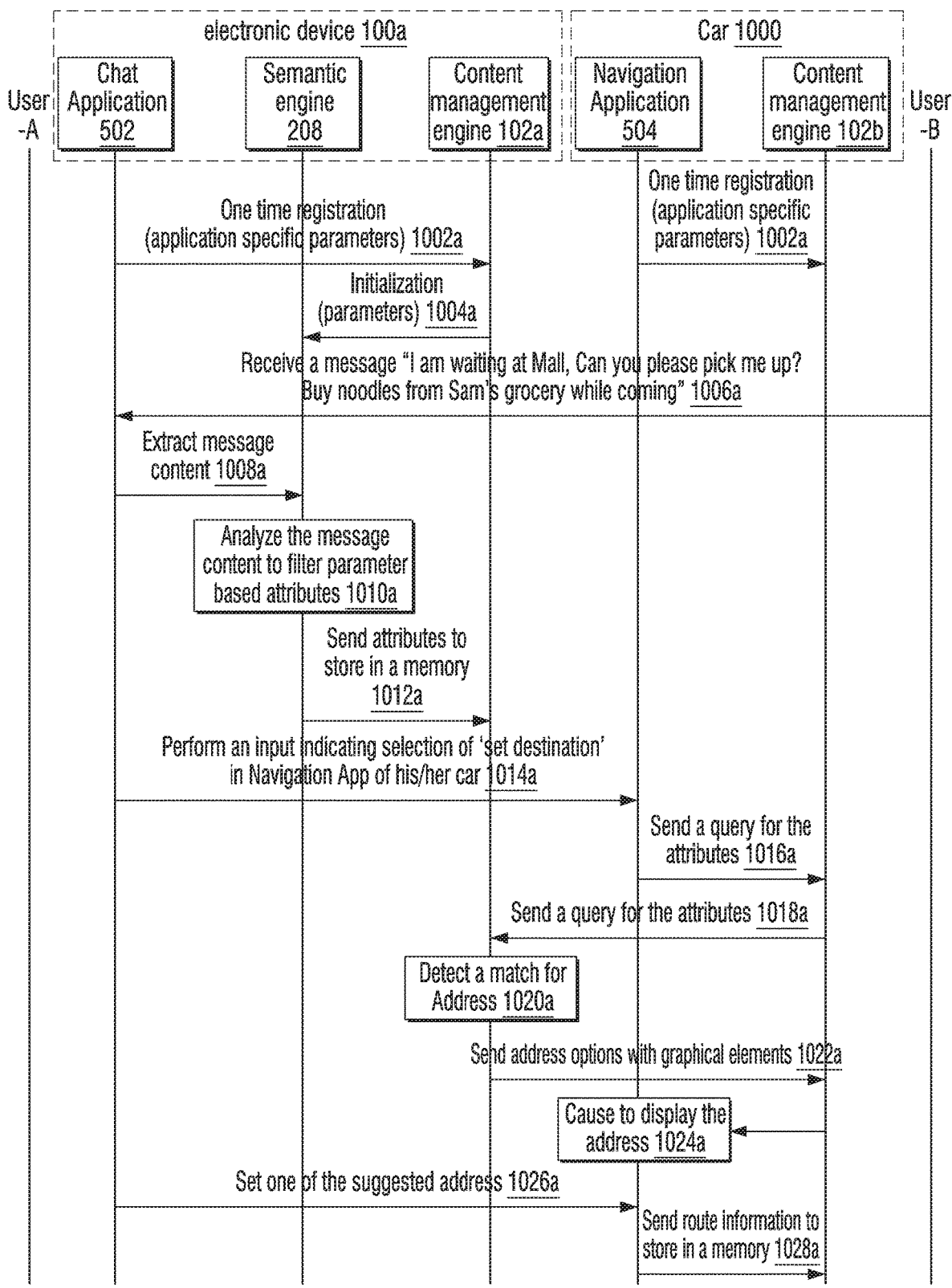
FIG. 10A is an example sequence diagram illustrating a method for automatically managing content between a User-A and a User-B according to an embodiment of the present disclosure.

FIG. 10A is an example sequence diagram illustrating a method for automatically managing the content between a User-A and a User-B according to an embodiment of the present disclosure.

Referring to FIG. 10A, the sequence diagram illustrates a sequence of operations performed between the electronic device 100a and a car 1000. The electronic device 100a includes the chat application 502, a semantic engine 208, and the content management engine 102a. The car 1000 includes the navigation application 504 and the content management engine 102b.

At operation 1002a, initially, the content management engine 102a extracts the parameters of the chat application 502 for one time registration. Similarly, the content management engine 102b extracts the parameters of the navigation application 504 for one time registration.

At operation 1004*a*, the content management engine 102*a* initializes the semantic engine 108. Further, the content management engine 102*a* sends the extracted parameters to the semantic engine 108.

At operation 1006*a*, the User-A receives a message "I am waiting at Mall, Can you please pick me up? Buy noodles from Sam's grocery while coming", in the chat application 502, from the User-B (i.e., wife of User-A).

At operation 1008*a*, the semantic engine 108 extracts the message content from the chat application 502.

At operation 1010*a*, after receiving the message content from the chat application 502, the semantic engine 108 analyzes the message content to filter the parameter based attributes.

At operation 1012*a*, after filtering the attributes, the semantic engine 108 sends the attributes to the content management engine 102*a*. The content management engine 102*a* stores the attributes in the memory 106*a*.

At operation 1014*a*, the navigation application 504 displayed on a dashboard of the car 1000 receives an input indicating the selection of the feature "set destination", by the User-A.

At operation 1016*a*, the navigation application 504 sends the query (i.e., In-device query) for the attributes, to the content management engine 102*b*.

At operation 1018*a*, the content management engine 102*b* sends the query (i.e., cross device query) for the attributes to the content management engine 102*a*.

At operation 1020*a*, the content management engine 102*a* detects the match for address.

At operation 1022*a*, if the match for address (i.e., Visit pending) is detected then, the content management engine 102*a* sends address options with the at least one graphical element (i.e., icons) to content management engine 102*b*.

At operation 1024*a*, the content management engine 102*b* displays the address options within the navigation application 504.

At operation 1026*a*, the User-A sets the suggested address as the destination address in the navigation application 504.

At operation 1028*a*, the route information is sent to the content management engine 102*b* to store in the memory 106*b*.

Figure 10B:
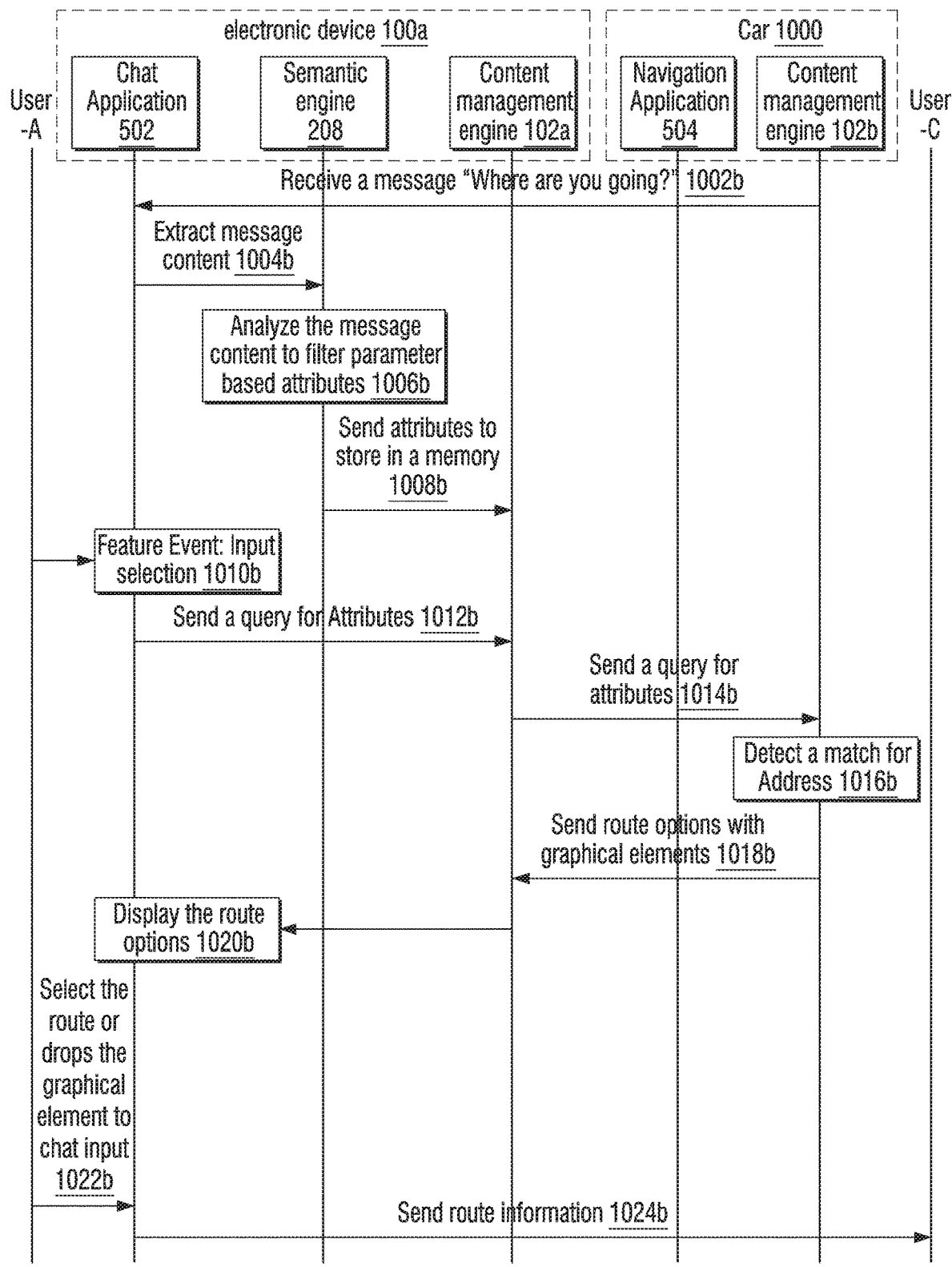
FIG. 10B is another sequence diagram for automatically managing content between a User-A and a User-C according to an embodiment of the present disclosure.

FIG. 10B is another sequence diagram for automatically managing the content between the User-A and a User-C according to an embodiment of the present disclosure.

Referring to FIG. 10B, the sequence diagram illustrates a sequence of operations performed between the electronic device 100*a* and the car 1000.

At operation 1002*b*, the User-A receives a message "Where are you going" in the chat application 502, from the User-C.

At operation 1004*b*, the semantic engine 108 extracts the message content from the chat application 502.

At operation 1006*b*, after receiving the message content from the chat application 502, the semantic engine 108 analyzes the message content to filter the parameter based attributes.

At operation 1008*b*, after filtering the attributes, the semantic engine 108 sends the attributes ((i.e., Requested data: the User-A next address, route information) and chat ID) to the content management engine 102*a*. The content management engine 102*a* stores the attributes in the memory 106*a*.

At operation 1010*b*, the User-A performs the feature event: Input selection in the chat application 502.

At operation 1012*b*, the chat application 502 sends the query (i.e., In-device query) for the attributes, to the content management engine 102*a*.

At operation 1014*b*, the content management engine 102*a* sends the query for the attributes (i.e., cross device query for the User-A present route information and destination address, etc.), to the content management engine 102*b*.

At operation 1016*b*, the content management engine 102*b* detects the match for address.

At operation 1018*b*, if the match for the route information is detected then, the content management engine 102*b* sends the route options with the graphical elements to the content management engine 102*a*.

At operation 1020*b*, the content management engine 102*a* displays the route options within the screen of the chat application 502.

At operation 1022*b*, the User-A selects the route or drops the graphical element to chat input.

At operation 1024*b*, the route information is sent to the content management engine 102*b* to store in the memory 106*b*.

In an embodiment, the at least one graphical element of varying size can be generated based on the priority.

FIGS. 11A, 11B, 11C, 11D, and 11E illustrate example scenarios in which content of an application is accessed from another application context according to various embodiments of the present disclosure. Here, the image meta-data is used to find the matching target destination as the chat interaction-id.

Figure 11A:
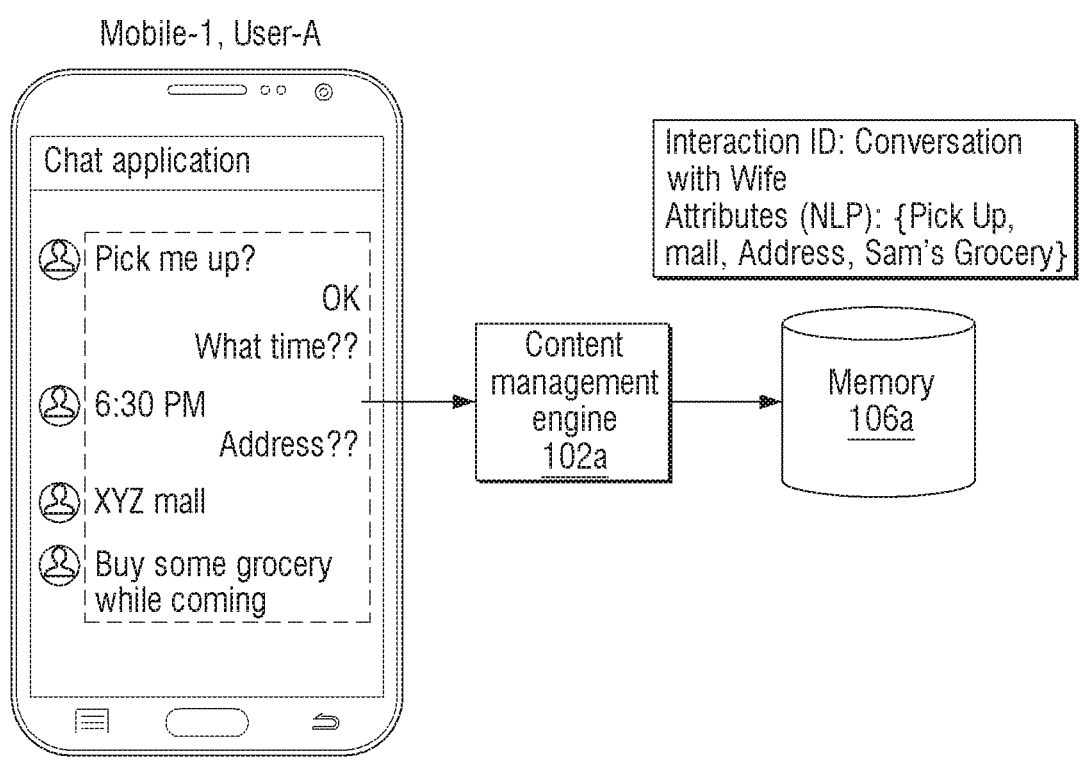
FIGS. 11A, 11B, 11C, 11D, and 11E illustrate example scenarios in which content of an application is accessed from another application context according to various embodiments of the present disclosure.
Figure 11B:
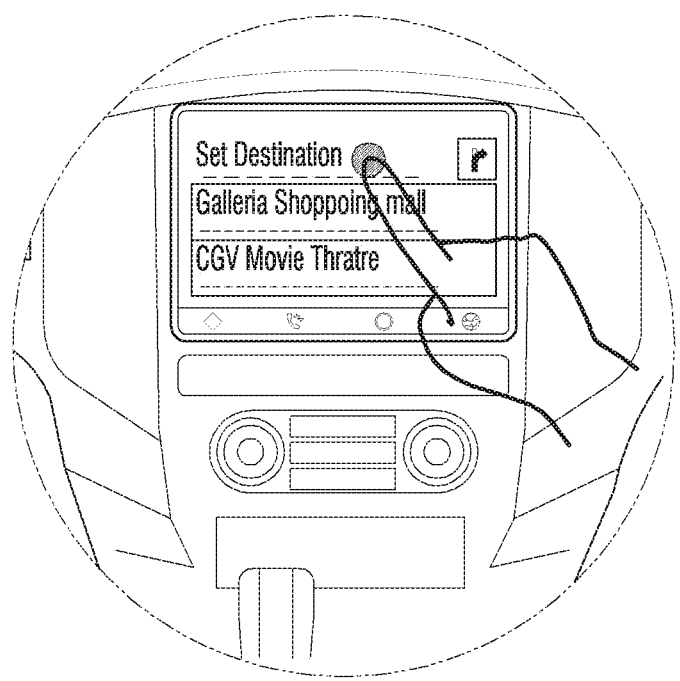
Figure 11C:
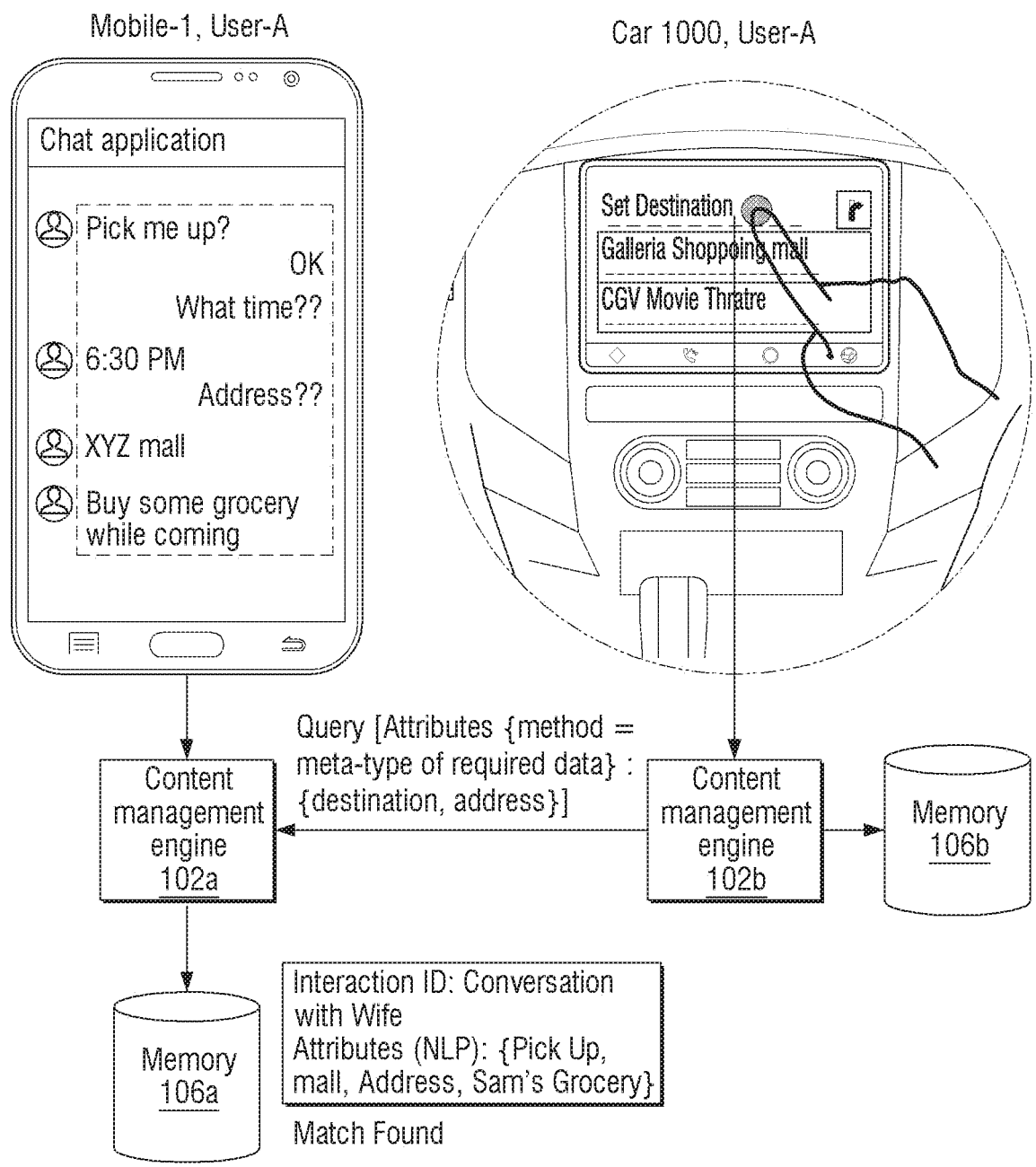
Figure 11D:
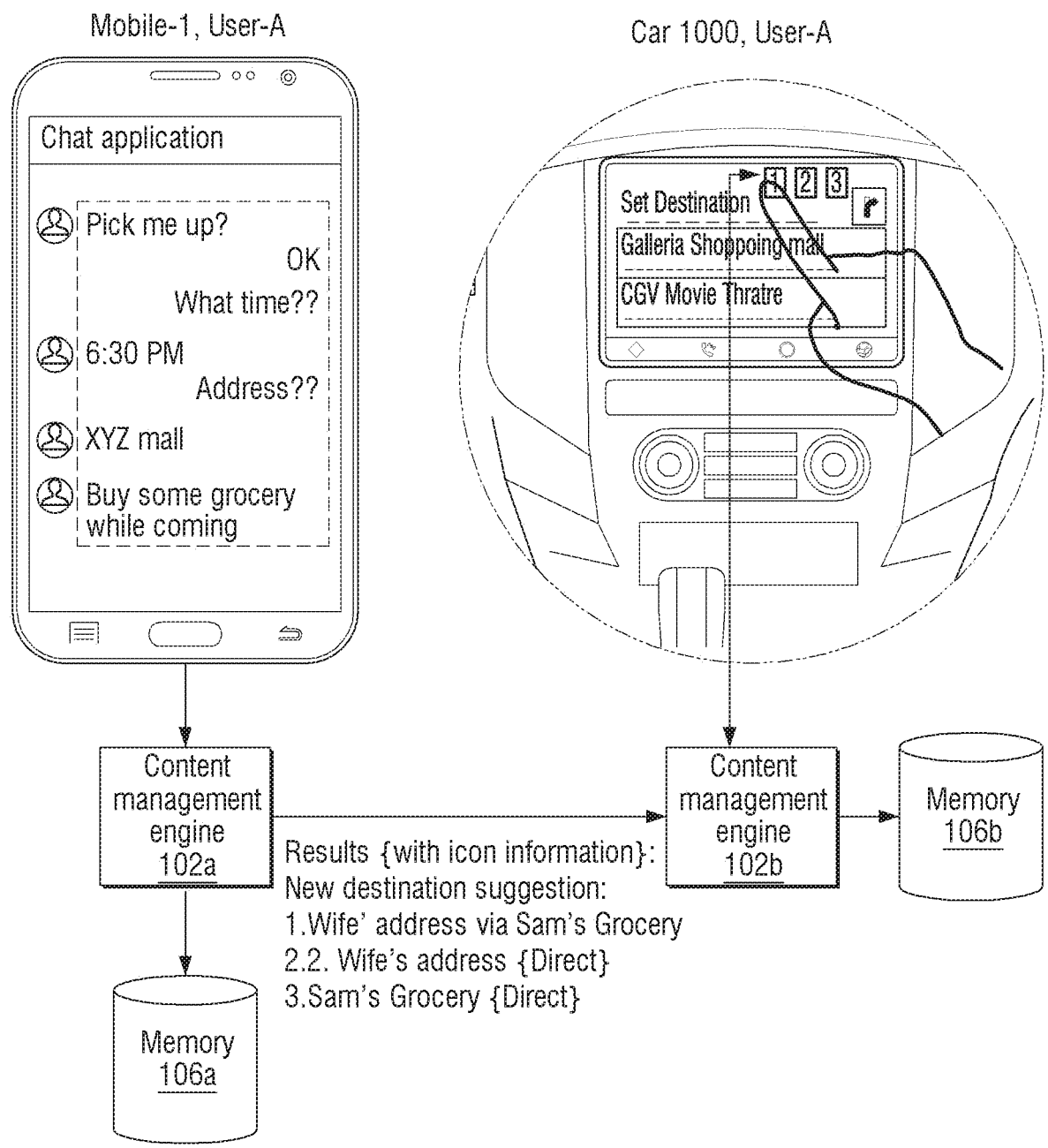
Figure 11E:
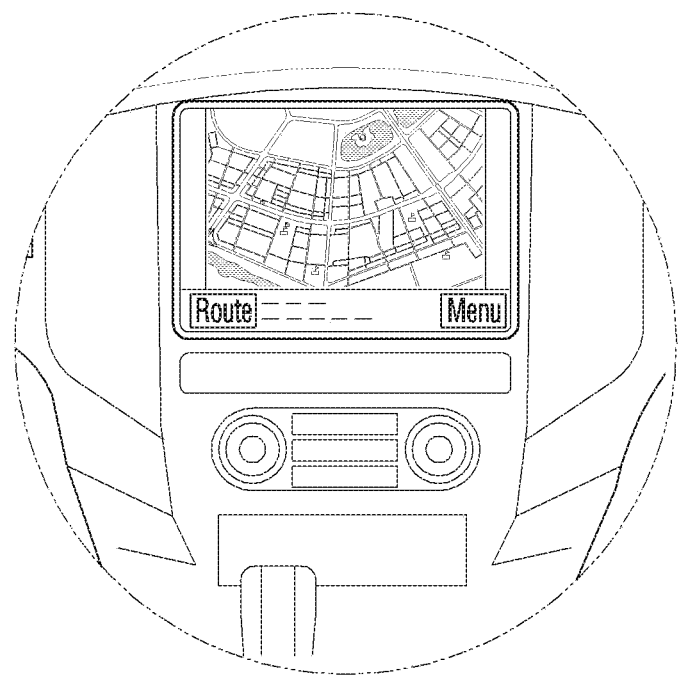

Referring to FIG. 11A, the chat conversation between the User-A; and the User-B (User-A wife) is as follows i.e., "I am waiting at the Mall, Can you please pick me at 5 PM? Buy noodles from the Sam's grocery while coming." Based on the chat conversation, the content management engine 102*a* can be configured to retrieve the interaction ID. The interaction ID can be Pick Up, Mall, Address, and Sam's Grocery. Further, the content management engine 102*a* can be configured to provide dynamic options for setting destination such as Pickup address via the Sam's Grocery.

Further, the content management engine 102*a* can be configured to provide the attributes. The attributes can be the destination point and the address. Later, the User-A enters his car 1000, the car 1000 display prompts to set the destination address as shown in the FIG. 11B. As soon as the User-A selects the destination setting, the content management engine 102*b* sends the query to the content management engine 102*a* to detect the match as shown in the FIG. 11C. Further, if the match is detected, the different address options are displayed based on the chat conversation as shown in the FIG. 11D. The user-A selects the first address option i.e., Wife' address via Sam's Grocery to be the destination address. The map corresponding to the same is displayed in the navigation screen of the car 1000 as shown in the FIG. 11E.

Figure 12A:
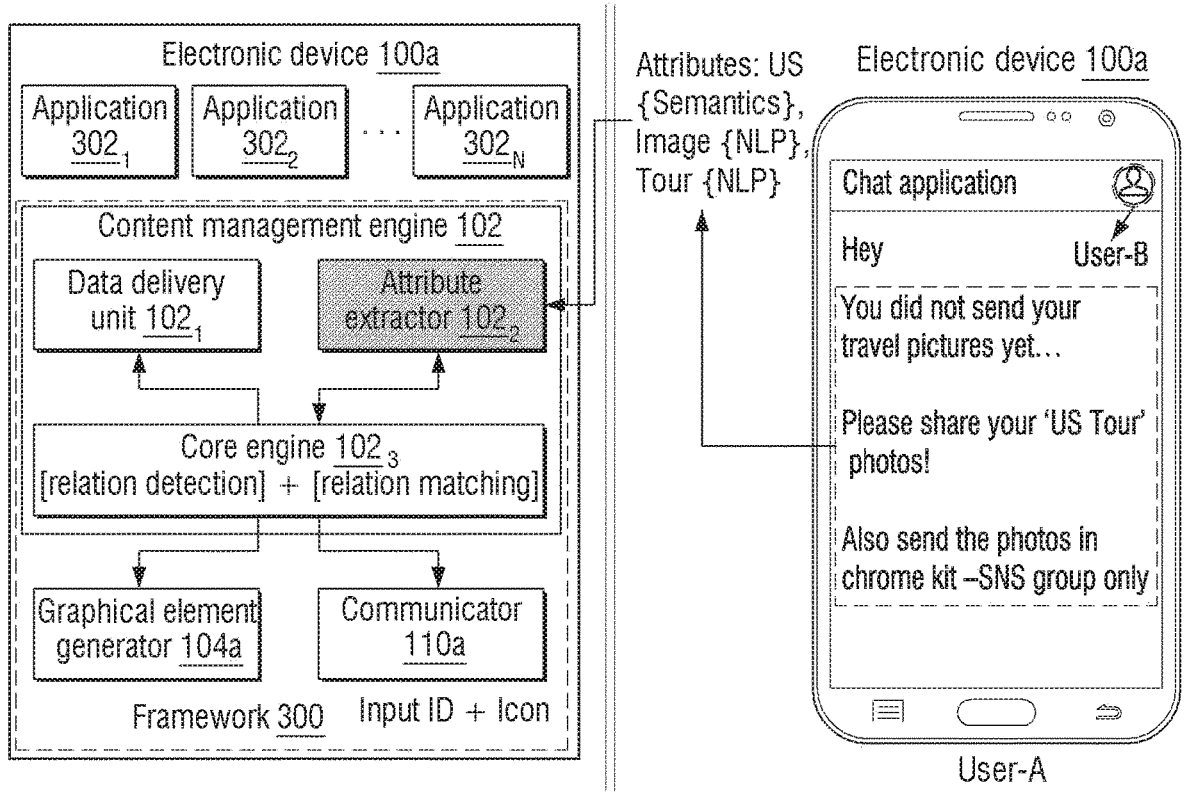
FIGS. 12A, 12B, and 12C illustrate example scenarios in which multiple electronic devices interact with content, in an Application-1 conversation, between a User-A and a User-B according to various embodiments of the present disclosure.
Figure 12B:
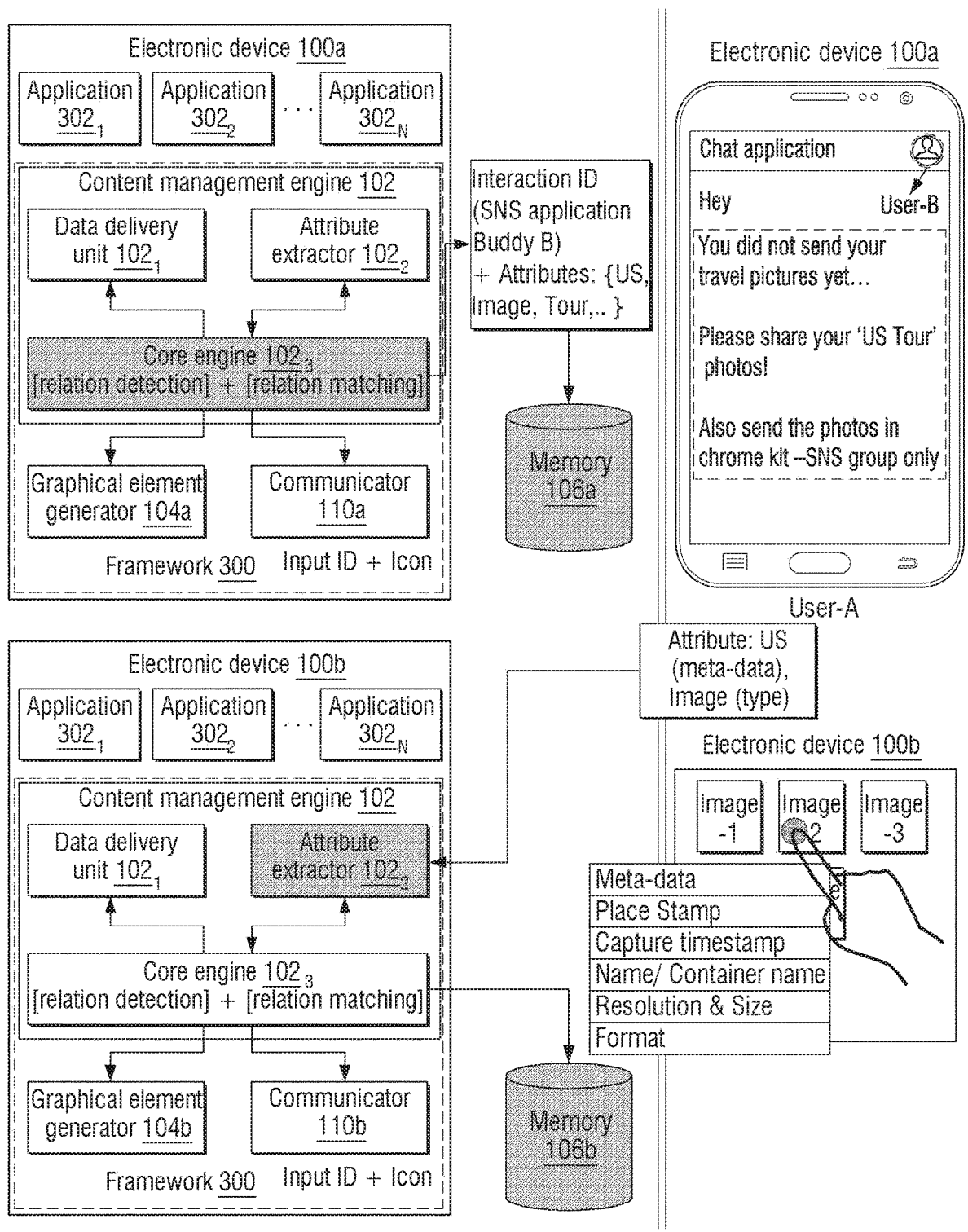
Figure 12C:
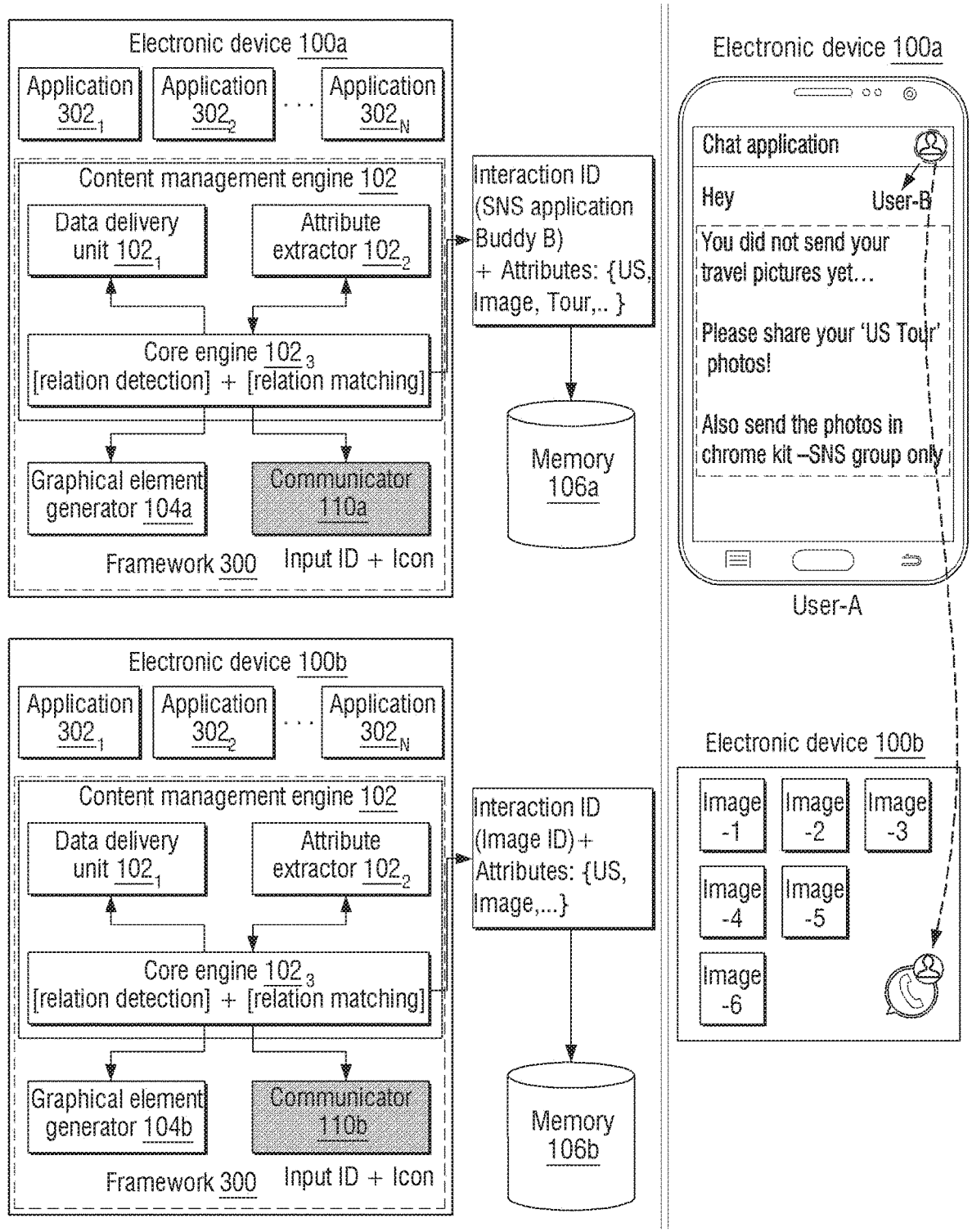

FIGS. 12A, 12B, and 12C illustrate example scenarios in which multiple electronic devices interact with content, in an Application-1 conversation, between a User-A and a User-B according to various embodiments of the present disclosure. The framework 300 components interact with the data when the user performs operations on the device screens.

Consider a scenario where a chat conversation is going on between the User-A; and the User-B. Here, the how User-A's electronic device 100*a* screen (e.g. a chat application) is shown.

The User-B requests to the User-A over chat: "Please share your US tour photos." Also, the User-B requests to send the photos in the same chat-group. The chat content is then processed by the content-management engine 102a in the electronic device 100a and attributes extracted along with interaction ID (i.e., chat ID with the User-B in specific chat application). These mappings are stored in the memory 106a as shown in the FIG. 12B.

Further, when the User-A opens his/her electronic device 100b gallery to share the photos as shown in the FIG. 12B, as soon as the User-A selects the US tour album photos, the meta-data attributes are extracted from the photo and the same is used to form a query by the content management unit 102b of the electronic device 100b and sent to the electronic device 100a as shown in the FIG. 12C. If a match is detected with previously stored interaction ID (i.e., chat with the User-B) then, the icon is generated and sent to the tablet. This generated icon is shown in the electronic device 100b, linking it to the actual destination of the electronic device 100a User-A's chat with the User-B as shown in the FIG. 12C. Once the User-A drops the image on to the icon by performing some gesture over the icon, the image content is sent across and finally it is posted in the chat input of the electronic device 100a.

Figure 13:
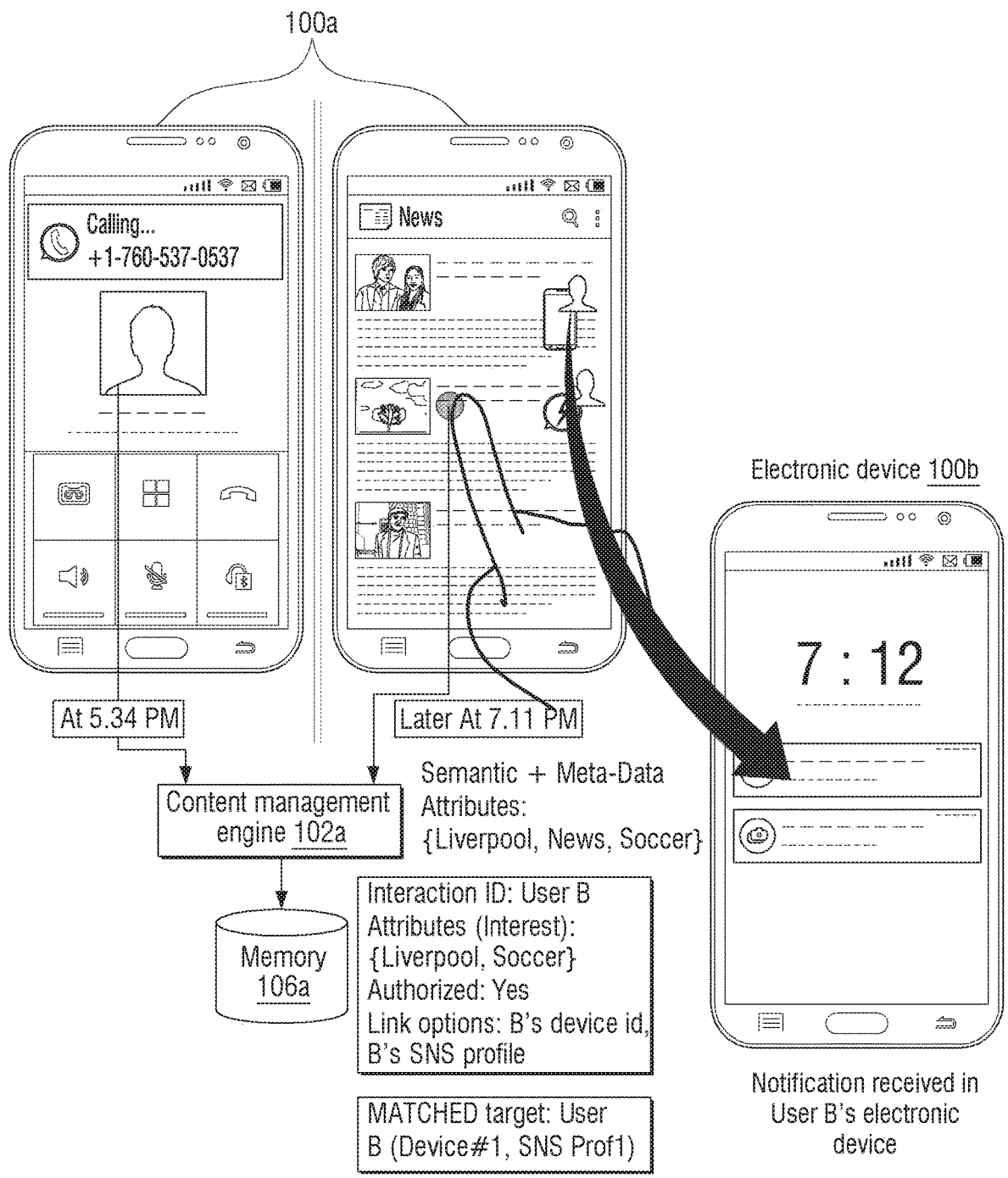
FIG. 13 illustrates an example scenario in which an electronic device interacts with content in a multi-user scenario according to an embodiment of the present disclosure.

FIG. 13 illustrates an example scenario in which an electronic device interacts with content in multi-user scenario according to an embodiment of the present disclosure.

Referring to FIG. 13, a conversation between User-A and User-B is shown. The User-B interest captured is "Soccer: Liverpool". Later, while the User-A is browsing web, related to the content displayed on the web page. Based on the related content, the electronic device 100a of the User-A displays the User-B electronic device 100b graphical element as well as the SNS graphical element. The electronic device 100a of the User-A sends the content to the User-B electronic device 100b, which can be viewed later.

Figure 14:
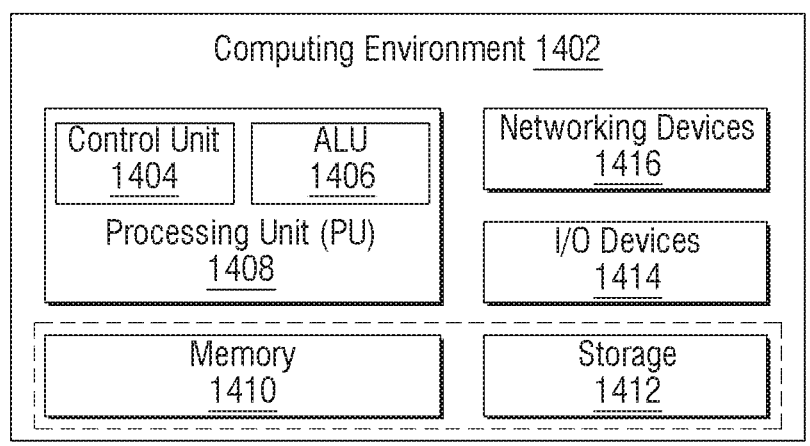
FIG. 14 illustrates a computing environment implementing a method and system for automatically managing content in an electronic device according to an embodiment of the present disclosure.

FIG. 14 illustrates a computing environment implementing a method and system for automatically managing content in an electronic device according to an embodiment of the present disclosure.

Referring to FIG. 14, as depicted, a computing environment 1402 comprises at least one processing unit 1408 that is equipped with a control unit 1404 and an arithmetic logic unit (ALU) 1406, a memory 1410, a storage unit 1412, plurality of networking devices 1416, and a plurality input/output (I/O) devices 1414. The processing unit ("processor") 1408 is responsible for processing the instructions of the schemes. The processing unit 1408 receives commands from the control unit 1404 in order to perform its processing. Further, any logical and arithmetic operations involved in the execution of the instructions are computed with the help of the ALU 1406. The various methods described in the present disclosure may be executed by the processing unit 1408.

The overall computing environment 1402 can be composed of multiple homogeneous or heterogeneous cores, multiple central processing units (CPUs) of different kinds, special media and other accelerators. The processing unit 1408 is responsible for processing the instructions of the schemes. Further, the plurality of processing units 1408 may be located on a single chip or over multiple chips.

The scheme comprising of instructions and codes required for the implementation are stored in either the memory unit 1410 or the storage 1412 or both. At the time of execution, the instructions may be fetched from the corresponding memory 1410 or storage unit 1412, and executed by the processing unit 1408.

In case of any hardware implementations various networking devices 1416 or external I/O devices 1414 may be connected to the computing environment to support the implementation through the networking unit and the I/O device unit. Networking devices 1416 comprises a communicator to communicate with at least one external device and other electronic devices through wired and/or wireless network.

The various embodiments disclosed herein can be implemented through at least one software program running on at least one hardware device and performing network management functions to control the elements. The elements shown in the FIGS. 1 to 4, 5A, 5B, 6 to 8, 9A, 9B, 10A, 10B, 11A to 11E, 12A to 12C, 13, and 14 include blocks which can be at least one of a hardware device, or a combination of hardware device and software units.

In accordance with an embodiment of the present disclosure, a method comprises determining first attributes of a first content in a first application by analyzing the first content while the first application is active in the electronic device, receiving a query request for second attributes corresponding to a second content of a second application executed in an external device from the external device, and in response to the second attributes request query, transmitting target data information for generating at least one icon to be displayed on the external device to the external device based on the first attributes and the second attributes.

The external device displays at least one icon corresponding to the target data information on an execution display of the second application of the external device.

In response to selection of the at least one icon on the external device, the external device displays target data associated with the data information corresponding to the second attributes on an execution display of the second application based on the content.

The determining the first attributes further comprises extracting parameters of the first application, filtering the first attributes using the parameters, and storing the filtered first attributes in a memory of the electronic device.

The transmitting further comprises detecting match information between the filtered first attributes and the second attributes, and determining the target data corresponding to the second attributes based on the match information.

The first application is at least one of chat, email, and message application, and the first content is at least one of text, image, video, and streaming which are executed in an execution screen of the first application and is selected or input by a user.

The first attributes are determined using metadata of the first content and NLP, and comprises route information, address information, and destination address information.

The second application is a navigation application, and the second content is associated with selection and input of the second content in the second application.

The second attributes are determined using metadata of the second content, and comprises address information, route information, and destination information.

The transmitting further comprises generating the at least one icon corresponding to the second attributes based on the match information, and displaying the generated at least one icon on an execution display of the first application of the electronic device.

In accordance with an embodiment of the present disclosure, an electronic device comprises a communicator configured to communicate with an external device, and a processor configured to determine first attributes of a first content in a first application by analyzing the first content while the first application is active in the electronic device, to receive a query request for second attributes corresponding to a second event of a second application executed in the external device from the external device, and to, in response to the second attributes request query, transmit target data information for generating at least one icon to be displayed on the external device to the external device based on the first attributes and the second attributes.

The electronic device further comprises a memory, and the processor is configured to extract parameters of the first application, to filter the first attributes using the parameters, and to store the filtered first attributes in the memory.

The processor is further configured to detect match information between the filtered first attributes and the second attributes, and to determine the target data corresponding to the second attributes based on the match information.

The electronic device further comprises a display, and the processor is further configured to generate the at least one icon corresponding to the second attributes based on the match information, and to control the display to display the generated at least one icon on an execution display of the first application of the electronic device.

For example, target data information is such as the link ID of at least one applications, interaction ID with which communicate the electronic device, target device, target application, target service, and target data with which the electronic device share as described above in the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for content management between a first electronic device and a second electronic device, the method comprising:
    identifying, by the first electronic device, a first content displayed at the first electronic device when a first application is active in the first electronic device;
    determining, by the first electronic device, one or more first attributes associated with at least one of the first application or the first content of the first application;
    receiving, by the first electronic device, a query request to share information between the first electronic device and the second electronic device, the query request being received from the second electronic device and including one or more second attributes corresponding to a second application executed at the second electronic device or a second content of the second application, at least one of the one or more second attributes being different from at least one of the one or more first attributes;
    determining, by the first electronic device, target data information to be shared with the second electronic device by matching the one or more first attributes and the one or more second attributes; and
    transmitting, from the first electronic device to the second electronic device, the target data information.

2. The method as claimed in claim 1, wherein at least one icon generated by the second electronic device is displayed within the second application executed on the second electronic device.

3. The method as claimed in claim 1, wherein the second electronic device is configured to:
    display at least one icon in response to receiving the target data information from the first electronic device, and
    display the target data information within the second application in response to receiving a second input associated with the at least one icon displayed at the second electronic device.

4. The method as claimed in claim 1,
    wherein the determining of the one or more first attributes further comprises:
        identifying one or more parameters associated with the first application or the first content of the first application, and
        obtaining the one or more first attributes by filtering the identified one or more parameters, or identifying relation information between the one or more parameters and at least one of a current user context or a historic user context, and
    wherein at least one of the obtained one or more first attributes or the filtered one or more parameters are stored in a memory of the first electronic device, or
    wherein at least one parameter among the one or more parameters is managed with a priority based on the relation information.

5. The method as claimed in claim 4, wherein the determining the one or more first attributes further comprises:
    transmitting, from the first electronic device to the second electronic device, a query for requesting the one or more second attributes corresponding to the second application or the second content of the second application, when the one or more first attributes are obtained or the one or more parameters are filtered.

6. The method as claimed in claim 1,
    wherein the first application is at least one of chat, email, or message application, and
    wherein the first content comprises at least one of icon, text, image, video, or streaming which is executed in an execution screen of the first application.

7. The method as claimed in claim 1,
    wherein the one or more first attributes are determined based on metadata of the first content and natural language processing (NLP), and
    wherein at least one of the first attributes comprise route information, address information, or destination address information.

8. The method as claimed in claim 1,
    wherein the second application is a navigation application, and
    wherein the second electronic device transmits the query request to the first electronic device in response to receiving an input within the second application.

9. The method as claimed in claim 1,
    wherein the second attributes correspond to one or more parameters associated with the second application or the second content of the second application, and
    wherein at least one parameter associated with the second application or the second content of the second application correspond to address information, route information, or destination information.

10. The method as claimed in claim 1, further comprising:
    generating, by the first electronic device, at least one icon corresponding to the second attributes; and
    displaying, by the first electronic device, the generated at least one icon on an execution screen of the first application of the first electronic device.

11. The method as claimed in claim 1, further comprises transmitting, from the first electronic device to the second electronic device, a no match found indication in response to determining that there is no target data information to be shared with the second device.

12. The method as claimed in claim 1, wherein the determining target data information to be shared further comprising,
identifying at least one first attribute that matching the one or more second attributes, and
determining at least portion of the first content associated with the identified first attribute as the target data information.

13. The method as claimed in claim 1,
wherein the one or more first attributes are based on a history of interactions with different applications stored at the first electronic device, and
wherein the one or more second attributes are based on a history of interactions with different applications stored at the second electronic device.

14. A first electronic device, comprising:
a transceiver configured to communicate with a second electronic device; and
at least one processor configured to:
identify a first content displayed at the first electronic device when a first application is active in the first electronic device,
determine one or more first attributes associated with at least one of the first application or the first content of the first application,
receive a query request to share information between the first electronic device and the second electronic device, the query request being received from the second electronic device and including one or more second attributes corresponding to a second application executed at the second electronic device or a second content of the second application, at least one of the one or more second attributes being different from at least one of the one or more first attributes,
determine target data information to be shared with the second electronic device by matching the one or more first attributes and the one or more second attributes, and
transmit the target data information to the second electronic device.

15. The first electronic device as claimed in claim 14, wherein at least one icon generated by the second electronic device is displayed within the second application executed on the second electronic device.

16. The first electronic device as claimed in claim 14, wherein the second electronic device is configured to:
display at least one icon in response to receiving the target data information from the first electronic device, and
display the target data information within the second application in response to receiving a second input associated with the at least one icon displayed at the second electronic device.

17. The first electronic device as claimed in claim 14, further comprising:
a memory;
wherein the at least one processor is further configured to:
identify one or more parameters associated with the first application or the first content of the first application, and
obtain the one or more first attributes by filtering the identified one or more parameters, or identifying relation information between the one or more parameters and at least one of a current user context or a historic user context,
wherein at least one of the obtained one or more first attributes or the filtered one or more parameters are stored in the memory of the first electronic device, or wherein at least one parameter among the one or more parameters is managed with a priority based on the relation information.

18. The first electronic device as claimed in claim 14,
wherein the first application is at least one of chat, email, or message application, and
wherein the first content is at least one of text, image, video, or streaming which is executed on an execution screen of the first application.

19. The first electronic device as claimed in claim 14,
wherein the one or more first attributes are determined using metadata of the first content and natural language processing (NLP), and
wherein at least one of the first attributes comprise route information, address information, or destination address information.

20. The first electronic device as claimed in claim 14,
wherein the second application is a navigation application, and
wherein the second electronic device transmits the query request to the first electronic device in response to receiving an input within the second application.

21. The first electronic device as claimed in claim 14,
wherein the electronic device further comprises:
a display, and
wherein the at least one processor is further configured to:
generate at least one icon corresponding to the second attributes, and
control the display to display the generated at least one icon on an execution screen of the first application of the first electronic device.

22. The first electronic device as claimed in claim 14, wherein the at least one processor is configured to transmit a no match found indication in response to determining that there is no target data information to be shared with the second device.

23. The first electronic device as claimed in claim 14, wherein the at least one processor is configured to identify at least one first attribute that matching the one or more second attributes, and determine at least portion of the first content associated with the identified first attribute as the target data information.

24. The first electronic device as claimed in claim 14, wherein the at least one processor is configured to transmit a query for requesting the one or more second attributes corresponding to the second application or the second content of the second application to the second electronic device, when the one or more first attributes are obtained or the one or more parameters are filtered.

25. The first electronic device as claimed in claim 14,
wherein the one or more first attributes are based on a history of interactions with different applications stored at the first electronic device, and
wherein the one or more second attributes are based on a history of interactions with different applications stored at the second electronic device.

26. The first electronic device as claimed in claim 14,
wherein the one or more first attributes are based on a history of interactions with different applications stored at the first electronic device, and
wherein the one or more second attributes are based on a history of interactions with different applications stored at the second electronic device.

27. A first electronic device, comprising:
a memory configured to store instructions; and
at least one processor, when executing the stored instructions, configured to:

identify a first content displayed at the first electronic device when a first application is active in the first electronic device, determine one or more attributes associated with at least one of the first application or the first content of the first application, receive a query request to share information between the first electronic device and the second electronic device, the query request being received from the second electronic device and including one or more second attributes corresponding to a second application executed at the second electronic device or a second content of the second application, at least one of the one or more second attributes being different from at least one of the one or more first attributes, determine target data information to be shared with the second electronic device by matching the one or more first attributes and the one or more second attributes, and transmit the target data information to the second electronic device.

* * * * *